(12) United States Patent
Song et al.

(10) Patent No.: US 11,529,612 B2
(45) Date of Patent: Dec. 20, 2022

(54) COMPOSITION CAPABLE OF REDUCING CO AND NOX EMISSIONS, PREPARATION METHOD THEREFOR AND USE THEREOF, AND FLUID CATALYTIC CRACKING METHOD

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Haitao Song, Beijing (CN); Qiuqiao Jiang, Beijing (CN); Huiping Tian, Beijing (CN); Wei Lin, Beijing (CN); Peng Wang, Beijing (CN); Yan Sun, Beijing (CN); Xue Yang, Beijing (CN); Jiushun Zhang, Beijing (CN); Zhijian Da, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 41 days.

(21) Appl. No.: 16/626,742

(22) PCT Filed: Jul. 5, 2018

(86) PCT No.: PCT/CN2018/094584
§ 371 (c)(1),
(2) Date: Dec. 26, 2019

(87) PCT Pub. No.: WO2019/007381
PCT Pub. Date: Jan. 10, 2019

(65) Prior Publication Data
US 2020/0129964 A1 Apr. 30, 2020

(30) Foreign Application Priority Data

Jul. 5, 2017 (CN) .......................... 201710542132.0
Jul. 5, 2017 (CN) .......................... 201710542172.5
(Continued)

(51) Int. Cl.
*B01J 23/745* (2006.01)
*B01J 6/00* (2006.01)
(Continued)

(52) U.S. Cl.
CPC ............. *B01J 23/745* (2013.01); *B01J 6/001* (2013.01); *B01J 23/75* (2013.01); *B01J 37/0045* (2013.01);
(Continued)

(58) Field of Classification Search
CPC . B01J 23/745; B01J 23/75; B01J 6/001; B01J 37/0045; B01J 37/0201
(Continued)

(56) References Cited

U.S. PATENT DOCUMENTS 4,755,282 A 7/1988 Samish et al.
5,021,144 A 6/1991 Altrichter
(Continued)

FOREIGN PATENT DOCUMENTS

CN 1022843 C 11/1993
CN 1688508 A 10/2005
(Continued)

OTHER PUBLICATIONS

Investigations of the reduction of NO to N2 by reaction with Fe under fuel-rich and oxidative atmosphere Janusz A. Lasek Heat Mass Transfer V50, pp. 933-943 (Year: 2014).*
(Continued)

*Primary Examiner* — Douglas B Call
(74) *Attorney, Agent, or Firm* — Novick, Kim & Lee, PLLC; Allen Xue

(57) ABSTRACT

The present invention relates to the field of catalytic cracking, and discloses a composition capable of reducing CO and
(Continued)

NOx emissions, the preparation method and use thereof, and a fluidized catalytic cracking method. The inventive composition capable of reducing CO and NOx emissions comprises an inorganic oxide carrier, and a first metal element, optionally a second metal element, optionally a third metal element and optionally a fourth metal element supported on the inorganic oxide carrier, wherein the first metal element includes Fe and Co, and wherein the weight ratio of Fe to Co is 1:(0.1-10) on an oxide basis. The inventive composition has better hydrothermal stability and higher activity of reducing CO and NOx emissions in the flue gas from the regeneration.

11 Claims, 3 Drawing Sheets

(30) Foreign Application Priority Data

| Jul. 5, 2017 | (CN) | 201710542174.4 |
|---|---|---|
| Jul. 5, 2017 | (CN) | 201710542183.3 |
| Jul. 5, 2017 | (CN) | 201710542849.5 |
| Jul. 5, 2017 | (CN) | 201710542866.9 |
| Jul. 5, 2017 | (CN) | 201710543243.3 |
| Jul. 5, 2017 | (CN) | 201710543245.2 |
| Jul. 5, 2017 | (CN) | 201710543264.5 |

(51) Int. Cl.

| B01J 23/75 | (2006.01) |
|---|---|
| B01J 37/00 | (2006.01) |
| B01J 37/02 | (2006.01) |
| C10G 11/02 | (2006.01) |
| C10G 11/18 | (2006.01) |
| B01J 21/04 | (2006.01) |

(52) U.S. Cl.
CPC ........... *B01J 37/0201* (2013.01); *C10G 11/02* (2013.01); *C10G 11/182* (2013.01); *B01J 21/04* (2013.01); *C10G 2300/405* (2013.01)

(58) Field of Classification Search
USPC .......................................................... 502/102
See application file for complete search history.

(56) References Cited

U.S. PATENT DOCUMENTS

| 5,727,385 | A | * | 3/1998 | Hepburn | F01N 13/009 60/297 |
|---|---|---|---|---|---|
| 6,165,933 | A | | 12/2000 | Peters et al. | |
| 7,045,056 | B2 | | 5/2006 | Kelkar et al. | |
| 2004/0077492 | A1 | | 4/2004 | Yaluris et al. | |
| 2007/0123417 | A1 | | 5/2007 | Stockwell | |
| 2010/0316547 | A1 | * | 12/2010 | Justice | F01N 3/103 423/230 |
| 2013/0130888 | A1 | * | 5/2013 | Thota | B01J 35/0026 502/22 |

FOREIGN PATENT DOCUMENTS

| CN | 101024179 A | 8/2007 |
|---|---|---|
| CN | 102371150 A | 3/2012 |
| CN | 102371165 A | 3/2012 |
| CN | 105363444 A | 3/2016 |
| JP | H08-057318 A | 3/1996 |
| JP | H08-323205 A | 12/1996 |
| JP | 2006503698 A | 2/2006 |
| RU | 2007143987 A | 6/2009 |
| WO | 2004014793 A1 | 2/2004 |
| WO | 2005099898 A1 | 10/2005 |
| WO | 2006050168 A1 | 7/2010 |

OTHER PUBLICATIONS

Highly Ordered Mesoporous Cobalt-Containing Oxides: Structure, Catalytic Properties, and Active Sites in Oxidation of Carbon Monoxide Dong Gu et al. Journal of the American Chemical Society, pp. 11407-11418 (Year: 2015).*

Wang, Lei et al.; Catalyst property of Co—Fe alloy particles in the steam reforming of biomass tar and toluene; Applied Catalysis B: Environmental, vol. 121-122, Jun. 1, 2012, pp. 95-104, XP055781940, Amsterdam, NL ISSN: 0926-3373, DOI: 10.1016/j.apcatb,2012.03.025.

* cited by examiner

COMPOSITION CAPABLE OF REDUCING CO AND NOX EMISSIONS, PREPARATION METHOD THEREFOR AND USE THEREOF, AND FLUID CATALYTIC CRACKING METHOD

TECHNICAL FIELD

The invention relates to the field of catalytic cracking, particularly to a composition capable of reducing CO and NOx emissions, a method for preparing a composition capable of reducing CO and NOx emissions, a composition capable of reducing CO and NOx emissions prepared by the method, a use of the composition capable of reducing CO and NOx emissions, and a fluidized catalytic cracking (FCC) method.

BACKGROUND

The continuous rising of the price of crude oil greatly increases the processing cost of a refinery. On one hand, the refinery can reduce the cost by purchasing low-price inferior oil; on the other hand, economic benefits may be increased by deeply processing heavy oils. Catalytic cracking is an important means for processing heavy oils in a refinery and plays an important role in the refinery. It is not only the main means for balancing heavy oils and producing clean fuels in the refinery, but also the key for energy conservation and efficiency enhancement in the refinery. Catalytic cracking is a fast catalytic reaction system associated with quick deactivation of catalysts. Accordingly, to find a solution for catalyst regeneration is always the main work for the development of catalytic cracking.

In a process of a fluidized catalytic cracking (FCC), the feed oil and a regenerated catalyst are quickly contacted in a riser to carry out catalytic cracking reaction. The coke formed in the reaction is deposited on the catalyst and causes its deactivation. The catalyst deactivated by the formed coke is stripped and then enters a regenerator in which it contacts with air or an oxygen-enriching air for regeneration which enters the regenerator from the bottom to carry out the regeneration by burning the coke. The regenerated catalyst is circulated back to the reactor to participate in the catalytic cracking reaction again. Based on the excess oxygen content in the flue gas from the regeneration process or the degree of CO oxidation, the catalytic cracking device can be divided into those with complete regeneration operation and with incomplete regeneration operation.

In a complete regeneration, the coke and the nitrogen-containing compounds in the coke form $CO_2$ and $N_2$ under the action of the air for regeneration. At the same time, pollutants such as CO, NOx and the like are formed. Using a catalytic additive is an important technical measure for controlling CO and NOx emissions.

The promoter for reducing CO emission in the flue gas from the regeneration is generally called a CO combustion promoter. For example, CN1022843C discloses a carbon monoxide combustion promoter of a supported noble metal, of which the active component is 1-1000 ppm platinum or 50-1000 ppm palladium, and the carrier is consisting of (1) 99.5-50% microsphere particles of a cracking catalyst or its matrix and (2) 0.5-50% $Al_2O_3$, 0-20% $RE_2O_3$ and 0-15% $ZrO_2$, wherein (2) is the outer coating of the particles (1).

The promoter for reducing NOx emission in a flue gas is generally called a NOx emission reduction additive or a NOx reduction additive. For example, CN102371150A discloses a non-noble metal composition for reducing NOx emission in the flue gas from the regeneration in a catalytic cracking unit, wherein the composition has a bulk density of no more than 0.65 g/mL and comprises, calculated as oxide, (1) 50-99% by weight of an inorganic oxide carrier, (2) 0.5-40% by weight of one or more selected from the group consisting of non-noble metal elements of Group IIA, IIB, IVB and VIB, and (3) 0.5-30% by weight of a rare earth element, based on the weight of the composition. When used in FCC, the composition can significantly reduce NOx emission in the flue gas from the regeneration.

There is also a kind of promoter capable of simultaneously reducing CO and NOx emissions in the flue gas from the regeneration, which can achieve both the promoting of CO combustion and the reducing of NOx emission. As regulations relating to environmental protection become increasingly strict, the application of such promoter becomes more and more common. For example, CN1688508A discloses a composition for reducing NOx and CO emissions in the flue gas from FCC and the use thereof, wherein the composition includes copper and/or cobalt and a carrier selected from the group consisting of hydrotalcite compounds, spinel, alumina, zinc titanate, zinc aluminate, and zinc titanate/zinc aluminate. CN102371165A discloses a low bulk density composition for reducing CO and NOx emissions in the flue gas from the regeneration in FCC, wherein the composition contains a rare earth element and one or more non-noble metal elements, preferably supported on a Y zeolite. U.S. Pat. No. 6,165,933 discloses a CO combustion promoting composition (promoter) for reducing NOx emission in a catalytic cracking process, comprising: (i) an acidic metal oxide substantially free of zeolite; (ii) an alkali metal, an alkaline earth metal or a mixture thereof; (iii) an oxygen storage component; and (iv) palladium, wherein the inorganic oxide carrier is preferably silica-alumina, and the oxygen storage transition metal oxide is preferably ceria. U.S. Pat. No. 7,045,056 discloses a composition for simultaneously reducing CO and NOx emissions in the flue gas from a catalytic cracking, comprising: (i) an inorganic oxide carrier; (ii) an oxide of cerium; (iii) an oxide of a lanthanide other than cerium, wherein the weight ratio of (ii) to (iii) is at least 1.66:1; (iv) optionally, an oxide of a transition metal of the Group IB and IIB; and (v) at least one noble metal element. CN105363444A discloses a composition for reducing CO and NOx emissions in the flue gas from the regeneration in FCC, comprising, calculated as oxide, (1) 0.5-30% by weight of a rare earth element, (2) 0.01-0.15% by weight of a noble metal element, and (3) balance of an inorganic oxide carrier substantially free of an alkali metal and an alkaline earth metal, and a preparation method thereof, in which the composition into which the noble metal is incorporated is treated with an alkaline solution before drying and/or calcining. When used in FCC, the disclosed composition can effectively avoid "afterburning" caused by high CO concentration in the flue gas from the regeneration, effectively control CO and NOx emissions in the flue gas from the regeneration, and significantly reduce NOx emission in the flue gas, and have substantially no adverse effect on the distribution of FCC products.

In an incomplete regeneration, due to the low content of excess oxygen and high concentration of CO in the flue gas, the concentration of NOx in the flue gas at the outlet of regenerator is very low, while the concentration of reduced nitrides such as $NH_3$, HCN and the like is high. Those reduced nitrides flow downstream along with the flue gas to the CO boiler for energy recovery, in which, if they are fully oxidized, NOx is formed and if they are not fully oxidized, the remaining $NH_3$ and the like may easily cause the ammonia-nitrogen in the downstream scrubber waste water to exceed the standard, or react with SOx in the flue gas to generate ammonium salt precipitates, which may cause salt deposition in the exhaust heat boiler or other flue gas post-treatment equipment (such as SCR), affecting the long-term operation of the device. Therefore, a catalytic additive is used in the regenerator in an incomplete regeneration process to catalyze the conversion of $NH_3$ and the like, so that the NOx emission in the flue gas may be reduced and the operation period of the device may be prolonged.

U.S. Pat. No. 5,021,144 discloses a method for reducing $NH_3$ emission in the flue gas from a FCC device with incomplete regeneration, wherein a CO combustion promoter is added into the regenerator in an excessive amount which is 2-3 times of the minimum quantity necessary to prevent the dilute phase bed from afterburning. Though such method can reduce $NH_3$ emission in the flue gas from a FCC device with incomplete regeneration, high amount of CO is used, which has the defect of high energy consumption and is not in favor of environmental protection.

U.S. Pat. No. 4,755,282 discloses a method for reducing $NH_3$ emission in the flue gas from a FCC device with partially regeneration or incomplete regeneration, wherein an ammonia decomposition catalyst with a particle size of 10-40 µm is added into the regenerator and maintained at a certain concentration in the dilute phase bed to convert $NH_3$ into $N_2$ and water. The active component of the ammonia decomposition catalyst may be a noble metal dispersed on an inorganic oxide carrier.

CN101024179A discloses a composition for reducing NOx used in a FCC process, comprising (i) an acidic metal oxide substantially free of zeolite, (ii) an alkali metal, an alkali earth metal or a mixture thereof, and (iii) an oxygen storage component. The composition prepared by impregnation of a noble metal is used to convert the gaseous reduced nitrogen containing substances in the flue gas from a catalytic cracking device with incomplete regeneration and thereby to reduce the NOx emission in the flue gas.

Currently, there are relatively few reports on the research and the use of the additive for controlling $NH_3$ and NOx emissions in the flue gas from a device with incomplete regeneration. Because of the significantly difference in the composition of the flue gas between a device with incomplete regeneration and that with complete regeneration, the existing catalytic additives suitable for the device with complete regeneration do not have an ideal effect when used in the device with incomplete regeneration. Although the additive compositions disclosed in the above documents can catalyze the conversion of reduced nitrides such as $NH_3$ and the like in the flue gas to a certain extent, the catalytic conversion activity for the reduced nitrides such as $NH_3$ and the like in the flue gas still needs to be further improved, so as to reduce the impact of the salt deposition from $NH_3$ and the like on the operation of the equipment. Therefore, there is a demand to develop an additive suitable for reducing pollutant emission in the flue gas of a device with incomplete regeneration to further reduce NOx emission in the flue gas.

SUMMARY OF THE INVENTION

To solve the defects of low catalytic conversion activity for the reduced nitrides such as $NH_3$ and the like in the regeneration process of the prior art, the present invention provides a new composition capable of reducing CO and NOx emissions, a method for preparing a composition capable of reducing CO and NOx emissions, a composition capable of reducing CO and NOx emissions prepared by the method, and a use of the composition capable of reducing CO and NOx emissions in treating a flue gas, as well as a fluidized catalytic cracking (FCC) method. The composition capable of reducing CO and NOx emissions in accordance with the present invention has high catalytic conversion activity for reduced nitrides, is obtainable by a simple method, and when used in a FCC process, can effectively reduce CO and NOx emissions in the flue gas from the regeneration in the FCC process. The composition capable of reducing CO and NOx emissions in accordance with the present invention is particularly suitable for treating the flue gas from the incomplete regeneration operation.

The present inventors have found during the study that, by using the non-noble metal elements of the Group VIII (referred to as "the first metal") which include Fe and Co as an active component together with an inorganic oxide as a carrier, it is possible to effectively reduce CO and NOx emissions in the flue gas from the regeneration in a catalytic cracking process. It is believed that the reasons may include the followings. The first metal comprises Fe and Co in specific contents, which leads to certain synergistic effect, which is advantageous for reducing the formation of oxidized nitrogen-containing compounds and promoting the decomposition of reduced nitrogen-containing compounds. The present inventors have also found that, when the first metal is used in combination with at least one metal element of the Group IA and/or IIA (referred to as "the second metal"), and/or at least one non-noble metal element of the Groups IB to VIIB (referred to as "the third metal"), and/or at least one of the noble metal elements (referred to as "the fourth metal"), wherein Fe and Co are used together as the main metal elements and modified with the second metal and/or the third metal and/or the fourth metal, it is possible to further reduce the formation of oxidized nitrogen-containing compounds and to further promote the decomposition of reduced nitrogen-containing compounds.

Through further study, it has been found that, preferably, after spray drying, by treating the solid materials obtained from the spray drying under a carbon-containing atmosphere at a high temperature, it is possible to reduce CO and NOx emissions in the flue gas from the regeneration in a catalytic cracking process more effectively. In the above preferred case, after the structure of the composition capable of reducing CO and NOx emissions may be further conditioned and stabilized, the composition capable of reducing CO and NOx emissions may have significantly improved catalytic conversion activity for the reduced nitrides such as $NH_3$ and the like, as well as better hydrothermal stability, and satisfy the requirements of the regenerator hydrothermal environment on the composition capable of reducing CO and NOx emissions.

Based on the above, in the first aspect in accordance with the present invention, it is provided a composition capable of reducing CO and NOx emissions, comprising: an inorganic oxide carrier and a first metal element supported on the inorganic oxide carrier, wherein the first metal element is selected from the group consisting of the non-noble metal elements of the Group VIII, wherein the first metal element includes Fe and Co, and wherein the weight ratio of Fe and Co is 1:(0.1-10) on an oxide basis. Optionally, the carrier is further supported with a second metal (which is at least one selected from the group consisting of the metal elements of the Group IA and/or IIA), and/or a third metal (which is at least one selected from the group consisting of the non-noble metal elements of the Groups IB to VIIB), and/or a fourth metal (which is at least one selected from the group consisting of the noble metal elements).

In the second aspect in accordance with the present invention, it is provided a method for preparing the composition capable of reducing CO and NOx emissions, comprising: making a slurry by mixing a precursor of the inorganic oxide carrier, a precursor of the first metal and water, spray drying the slurry and then calcining to obtain the composition. When the carrier is further supported with a second metal and/or a third metal, the method comprises making a slurry by mixing a precursor of the inorganic oxide carrier, a precursor of the first metal, a precursor of the second metal and/or a precursor of the third metal and water, spray drying the slurry and then calcining to obtain the composition. When the carrier is further supported with a fourth metal, the method further includes: impregnating the composition obtained in the previous steps in an impregnating solution containing a precursor of the fourth metal, to obtain a solid product, and then drying the solid product and/or performing a second calcining on the solid product.

In the third aspect in accordance with the present invention, it is provided a composition capable of reducing CO and NOx emissions prepared by the above preparation method.

In the fourth aspect in accordance with the present invention, it is provided a use of the composition capable of reducing CO and NOx emissions in treating a flue gas.

In the fifth aspect in accordance with the present invention, it is provided a use of the composition capable of reducing CO and NOx emissions in treating the flue gas from the regeneration in a catalytic cracking process.

In the sixth aspect in accordance with the present invention, it is provided a fluidized catalytic cracking method, comprising: contacting and reacting a hydrocarbon oil with a catalyst, and regenerating the catalyst after the contacting and reacting, wherein the catalyst comprises a catalytic cracking catalyst and a composition capable of reducing CO and NOx emissions, and wherein the composition capable of reducing CO and NOx emissions is the composition capable of reducing CO and NOx emissions in accordance with the present invention.

In particular, the present invention relates to the following items.

1. A composition capable of reducing CO and NOx emissions, comprising: an inorganic oxide carrier and a first metal element supported on the inorganic oxide carrier, wherein the first metal element is selected from the group consisting of the non-noble metal elements of the Group VIII, wherein the first metal element includes Fe and Co, and wherein the weight ratio of Fe to Co is 1:(0.1-10) on an oxide basis.

2. A composition capable of reducing CO and NOx emissions, comprising: an inorganic oxide carrier and a first metal element and a second metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.1-10) on an oxide basis, and wherein the second metal is at least one selected from the group consisting of the metal elements of the Group IA and/or IIA.

3. A composition capable of reducing CO and NOx emissions, comprising: an inorganic oxide carrier and a first metal element and a third metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.1-10) on an oxide basis, and wherein the third metal is at least one selected from the group consisting of the non-noble metal elements of the Groups IB to VIIB.

4. A composition capable of reducing CO and NOx emissions, comprising: an inorganic oxide carrier and a first metal element and a fourth metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, and wherein the fourth metal is at least one selected from the group consisting of the noble metal elements.

5. A composition capable of reducing CO and NOx emissions, comprising: an inorganic oxide carrier and a first metal element, a second metal element and a third metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, wherein the second metal is at least one selected from the group consisting of the metal elements of the Group IA and/or IIA, and wherein the third metal is at least one selected from the group consisting of the non-noble metal elements of the Groups IB to VIIB.

6. A composition capable of reducing CO and NOx emissions, comprising: an inorganic oxide carrier and a first metal element, a second metal element and a fourth metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, wherein the second metal is at least one selected from the group consisting of the metal elements of the Group IA and/or IIA, and wherein the fourth metal is at least one selected from the group consisting of the noble metal elements.

7. A composition capable of reducing CO and NOx emissions, comprising: an inorganic oxide carrier and a first metal element, a third metal element and a fourth metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, the third metal is at least one selected from the group consisting of the non-noble metal elements of the Groups IB to VIIB, and wherein the fourth metal is at least one selected from the group consisting of the noble metal elements.

8. A composition capable of reducing CO and NOx emissions, comprising: an inorganic oxide carrier and a first metal element, a second metal element, a third metal element and a fourth metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, wherein the second metal is at least one selected from the group consisting of the metal elements of the Group IA and/or IIA, wherein the third metal is at least one selected from the group consisting of the non-noble metal elements of the Groups IB to VIIB, and wherein the fourth metal is at least one selected from the group consisting of the noble metal elements.

9. The composition according to any one of the preceding items, wherein, based on the total weight of the composition, the inorganic oxide carrier is in an amount of 60-95% by weight, and the total of Fe and Co is in an amount of 5-40% by weight on an oxide basis, preferably, the inorganic oxide carrier is in an amount of 75-92% by weight, and the total of Fe and Co is in an amount of 8-25% by weight on an oxide basis, preferably, the inorganic oxide carrier is in an amount of 84-90% by weight, and the total of Fe and Co is in an amount of 10-16% by weight on an oxide basis.

10. The composition according to any one of the preceding items, wherein, based on the total weight of the composition, the inorganic oxide carrier is in an amount of 50-90% by weight, and on an oxide basis, the first metal element is in an amount of 3-30% by weight, and the second metal element is in an amount of 1-20% by weight, preferably, the inorganic oxide carrier is in an amount of 60-90% by weight, and on an oxide basis, the first metal element is in an amount of 5-25% by weight, and the second metal element is in an amount of 5-15% by weight, further preferably, the inorganic oxide carrier is in an amount of 72-85% by weight, and on an oxide basis, the first metal element is in an amount of 10-16% by weight, and the second metal element is in an amount of 5-12% by weight.

11. The composition according to any one of the preceding items, wherein, based on the total weight of the composition, the inorganic oxide carrier is in an amount of 50-90% by weight, and on an oxide basis, the first metal element is in an amount of 3-30% by weight, and the third metal element is in an amount of 1-20% by weight, preferably, the inorganic oxide carrier is in an amount of 60-90% by weight, and on an oxide basis, the first metal element is in an amount of 5-25% by weight, and the third metal element is in an amount of 2-15% by weight, further preferably, the inorganic oxide carrier is in an amount of 76-86% by weight, and on an oxide basis, the first metal element is in an amount of 10-16% by weight, and the third metal element is in an amount of 2-8% by weight.

12. The composition according to any one of the preceding items, wherein, based on the total weight of the composition, the inorganic oxide carrier is in an amount of 59.9-94.995% by weight, the first metal element is in an amount of 5-40% by weight on an oxide basis, and the fourth metal element is in an amount of 0.005-0.1% by weight on an element basis, preferably, the inorganic oxide carrier is in an amount of 74.92-91.99% by weight, the first metal element is in an amount of 8-25% by weight on an oxide basis, and the fourth metal element is in an amount of 0.01-0.08% by weight on an element basis, further preferably, the inorganic oxide carrier is in an amount of 83.93-89.95% by weight, the first metal element is in an amount of 10-16% by weight on an oxide basis, and the fourth metal element is in an amount of 0.05-0.07% by weight on an element basis.

13. The composition according to any one of the preceding items, wherein, based on the total weight of the composition, the inorganic oxide carrier is in an amount of 10-90% by weight, and on an oxide basis, the first metal element is in an amount of 0.5-50% by weight, the second metal element is in an amount of 0.5-20% by weight, and the third metal element is in an amount of 0.5-20% by weight, preferably, the inorganic oxide carrier is in an amount of 50-90% by weight, and on an oxide basis, the first metal element is in an amount of 3-30% by weight, the second metal element is in an amount of 1-20% by weight, and the third metal element is in an amount of 1-10% by weight, further preferably, the inorganic oxide carrier is in an amount of 55-85% by weight, and on an oxide basis, the first metal element is in an amount of 5-25% by weight, the second metal element is in an amount of 5-15% by weight, and the third metal element is in an amount of 2-8% by weight.

14. The composition according to any one of the preceding items, wherein, based on the total weight of the composition, the inorganic oxide carrier is in an amount of 30-90% by weight, and on an oxide basis, the first metal element is in an amount of 0.5-50% by weight, the second metal element is in an amount of 0.5-20% by weight, and on an element basis, the fourth metal element is in an amount of 0.001-0.15% by weight, preferably, the inorganic oxide carrier is in an amount of 50-90% by weight, and on an oxide basis, the first metal element is in an amount of 3-30% by weight, the second metal element is in an amount of 1-20% by weight, and on an element basis, the fourth metal element is in an amount of 0.005-0.1% by weight, further preferably, the inorganic oxide carrier is in an amount of 60-85% by weight, and on an oxide basis, the first metal element is in an amount of 5-25% by weight, the second metal element is in an amount of 2-15% by weight, and on an element basis, the fourth metal element is in an amount of 0.01-0.08% by weight.

15. The composition according to any one of the preceding items, wherein, based on the total weight of the composition, the inorganic oxide carrier is in an amount of 30-90% by weight, and on an oxide basis, the first metal element is in an amount of 0.5-50% by weight, the third metal element is in an amount of 0.5-20% by weight, and on an element basis, the fourth metal element is in an amount of 0.001-0.15% by weight, preferably, the inorganic oxide carrier is in an amount of 50-90% by weight, and on an oxide basis, the first metal element is in an amount of 3-30% by weight, the third metal element is in an amount of 1-20% by weight, and on an element basis, the fourth metal element is in an amount of 0.005-0.1% by weight, further preferably, the inorganic oxide carrier is in an amount of 60-85% by weight, and on an oxide basis, the first metal element is in an amount of 5-25% by weight, the third metal element is in an amount of 2-15% by weight, and on an element basis, the fourth metal element is in an amount of 0.01-0.08% by weight.

16. The composition according to any one of the preceding items, wherein, based on the total weight of the composition, the inorganic oxide carrier is in an amount of 10-90% by weight, and on an oxide basis, the first metal element is in an amount of 0.5-50% by weight, the second metal element is in an amount of 0.5-20% by weight, the third metal element is in an amount of 0.5-20% by weight, and on an element basis, the fourth metal element is in an amount of 0.001-0.15% by weight, preferably, the inorganic oxide carrier is in an amount of 50-90% by weight, and on an oxide basis, the first metal element is in an amount of 3-30% by weight, the second metal element is in an amount of 1-20% by weight, the third metal element is in an amount of 1-10% by weight, and on an element basis, the fourth metal element is in an amount of 0.005-0.1% by weight, further preferably, the inorganic oxide carrier is in an amount of 55-85% by weight, and on an oxide basis, the first metal element is in an amount of 5-25% by weight, the second metal element is in an amount of 5-15% by weight, the third metal element is in an amount of 2-8% by weight, and on an element basis, the fourth metal element is in an amount of 0.01-0.08% by weight.

17. The composition according to any one of the preceding items, wherein the weight ratio of Fe to Co is 1:(0.1-10), preferably 1:(0.3-3), and further preferably 1:(0.5-2) on an oxide basis.

18. The composition according to any one of the preceding items, wherein
at least part of Fe in the composition is presented in a form of iron carbide and/or elemental iron;
at least part of Co in the composition is presented in a form of cobalt monooxide and/or elemental cobalt;
preferably, at least part of Fe in the composition is presented in a form of iron carbide;
at least part of Co in the composition is presented in a form of elemental cobalt;
more preferably, the XRD pattern of the composition includes diffraction peaks at $2\theta$ of 42.6°, 44.2° and 44.9°.

19. The composition according to any one of the preceding items, wherein the inorganic oxide carrier is at least one selected from the group consisting of alumina, silica-alumina, zeolite, spinel, kaolin, diatomite, perlite and perovskite,
preferably at least one selected from the group consisting of alumina, spinel and perovskite,
and further preferably alumina.

20. The composition according to any one of the preceding items, wherein the second metal element is at least one selected from the group consisting of Na, K, Mg and Ca, preferably K and/or Mg, most preferably Mg;
the third metal element is at least one selected from the group consisting of Cu, Zn, Ti, Zr, V, Cr, Mo, W, Mn and rare earth elements, preferably at least one selected from the group consisting of Zr, V, W, Mn, Ce and La, most preferably Mn;
the fourth metal element is at least one selected from the group consisting of Pt, Ir, Pd, Ru and Rh, most preferably Ru.

21. A method for preparing a composition capable of reducing CO and NOx emissions, comprising:
making a slurry by mixing a precursor of an inorganic oxide carrier, a precursor of a first metal and water, spray drying the slurry and then calcining;
wherein, the precursor of the first metal element includes a precursor of Fe and a precursor of Co, wherein the precursor of Fe and the precursor of Co are used in amounts such that the weight ratio of Fe to Co in the obtained composition is 1:(0.1-10) on an oxide basis.

22. A method for preparing a composition capable of reducing CO and NOx emissions, comprising:
making a slurry by mixing a precursor of an inorganic oxide carrier, a precursor of a first metal, a precursor of a second metal and water, spray drying the slurry and then calcining;
wherein the first metal element is selected from the group consisting of the non-noble metal elements of the Group VIII, wherein the first metal element includes Fe and Co, wherein the second metal is at least one selected from the group consisting of the metal elements of the Group IA and/or IIA, and wherein, in the precursor of the first metal element, the precursor of Fe and the precursor of Co are used in amounts such that the weight ratio of Fe to Co in the obtained composition is 1:(0.1-10) on an oxide basis.

23. A method for preparing a composition capable of reducing CO and NOx emissions, comprising:
making a slurry by mixing a precursor of an inorganic oxide carrier, a precursor of a first metal, a precursor of a third metal and water, spray drying the slurry and then calcining;
wherein the first metal element is selected from the group consisting of the non-noble metal elements of the Group VIII, wherein the first metal element includes Fe and Co, wherein the third metal is at least one selected from the group consisting of the non-noble metal elements of the Groups IB to VIIB, and wherein, in the precursor of the first metal element, the precursor of Fe and the precursor of Co are used in amounts such that the weight ratio of Fe to Co in the obtained composition is 1:(0.1-10) on an oxide basis.

24. A method for preparing a composition capable of reducing CO and NOx emissions, comprising:
(1) making a slurry by mixing a precursor of an inorganic oxide carrier, a precursor of a first metal, and water, spray drying the slurry and performing first calcining to obtain a semi-finished composition;
(2) impregnating the semi-finished composition obtained in the step (1) in an impregnating solution containing a precursor of a fourth metal element to obtain a solid product, and then then drying the solid product and/or performing second calcining,
wherein the first metal element is selected from the group consisting of the non-noble metal elements of the Group VIII, wherein the first metal element includes Fe and Co, wherein the fourth metal is at least one selected from the group consisting of noble metal elements, and wherein, in the precursor of the first metal element, the precursor of Fe and the precursor of Co are used in amounts such that the weight ratio of Fe to Co in the obtained composition is 1:(0.05-20) on an oxide basis.

25. A method for preparing a composition capable of reducing CO and NOx emissions, comprising:
making a slurry by mixing a precursor of an inorganic oxide carrier, a precursor of a first metal, a precursor of a second metal, a precursor of a third metal and water, spray drying the slurry and then calcining;
wherein the first metal element is selected from the group consisting of the non-noble metal elements of the Group VIII, wherein the first metal element includes Fe and Co, wherein the second metal is at least one selected from the group consisting of the metal elements of the Group IA and/or IIA, wherein the third metal is at least one selected from the group consisting of the non-noble metal elements of the Groups IB to VIIB, and wherein, in the precursor of the first metal element, the precursor of Fe and the precursor of Co are used in amounts such that the weight ratio of Fe to Co in the obtained composition is 1:(0.05-20) on an oxide basis.

26. A method for preparing a composition capable of reducing CO and NOx emissions, comprising:
(1) making a slurry by mixing a precursor of an inorganic oxide carrier, a precursor of a first metal, a precursor of a second metal and water, spray drying the slurry and then performing first calcining to obtain a semi-finished composition;
(2) impregnating the semi-finished composition obtained in the step (1) in an impregnating solution containing a precursor of a fourth metal element to obtain a solid product, and then then drying the solid product and/or performing second calcining,
wherein the first metal element is selected from the group consisting of the non-noble metal elements of the Group VIII, wherein the first metal element includes Fe and Co, wherein the second metal is at least one selected from the group consisting of the metal elements of the Group IA and/or IIA, wherein the fourth metal is at least one selected from the group consisting of noble metal elements, and wherein, in the precursor of the first metal element, the precursor of Fe and the precursor of Co are used in amounts such that the weight ratio of Fe to Co in the obtained composition is 1:(0.05-20) on an oxide basis.

27. A method for preparing a composition capable of reducing CO and NOx emissions, comprising:

(1) making a slurry by mixing a precursor of an inorganic oxide carrier, a precursor of a first metal, a precursor of a third metal, and water, spray drying the slurry and then performing first calcining to obtain a semi-finished composition;

(2) impregnating the semi-finished composition obtained in the step (1) in an impregnating solution containing a precursor of a fourth metal element to obtain a solid product, and then drying the solid product and/or performing second calcining, wherein the first metal element is selected from the group consisting of the non-noble metal elements of the Group VIII, wherein the first metal element includes Fe and Co, wherein the third metal is at least one selected from the group consisting of the non-noble metal elements of the Groups IB to VIIB, wherein the fourth metal is at least one selected from the group consisting of noble metal elements, and wherein, in the precursor of the first metal element, the precursor of Fe and the precursor of Co are used in amounts such that the weight ratio of Fe to Co in the obtained composition is 1:(0.05-20) on an oxide basis.

28. A method for preparing a composition capable of reducing CO and NOx emissions, comprising:

(1) making a slurry by mixing a precursor of an inorganic oxide carrier, a precursor of a first metal, a precursor of a second metal, a precursor of a third metal, and water, spray drying the slurry and then performing first calcining to obtain a semi-finished composition;

(2) impregnating the semi-finished composition obtained in the step (1) in an impregnating solution containing a precursor of a fourth metal element to obtain a solid product, and then drying the solid product and/or performing second calcining, wherein the first metal element is selected from the group consisting of the non-noble metal elements of the Group VIII, wherein the first metal element includes Fe and Co, wherein the second metal is at least one selected from the group consisting of the metal elements of the Group IA and/or IIA, wherein the third metal is at least one selected from the group consisting of the non-noble metal elements of the Groups IB to VIIB, wherein the fourth metal is at least one selected from the group consisting of the noble metal elements, and wherein, in the precursor of the first metal element, the precursor of Fe and the precursor of Co are used in amounts such that the weight ratio of Fe to Co in the obtained composition is 1:(0.05-20) on an oxide basis.

29. The method according to any one of the preceding items, wherein, the precursor of the inorganic oxide carrier and the precursor of the first metal element are used in amounts such that in the obtained composition, based on the total weight of the composition, the inorganic oxide carrier is in an amount of 60-95% by weight, and the total of Fe and Co is in an amount of 5-40% by weigh on an oxide basis, preferably, the inorganic oxide carrier is in an amount of 75-92% by weight, and the total of Fe and Co is in an amount of 8-25% by weight on an oxide basis, preferably, the inorganic oxide carrier is in an amount of 84-90% by weight, and the total of Fe and Co is in an amount of 10-16% by weight on an oxide basis.

30. The method according to any one of the preceding items, wherein, the precursor of the inorganic oxide carrier, the precursor of the first metal element and the precursor of the second metal element are used in amounts such that in the obtained composition, based on the total weight of the composition, the inorganic oxide carrier is in an amount of 50-90% by weight, and on an oxide basis, the first metal element is in an amount of 3-30% by weight, and the second metal element is in an amount of 1-20% by weight, preferably, the inorganic oxide carrier is in an amount of 60-90% by weight, and on an oxide basis, the first metal element is in an amount of 5-25% by weight, and the second metal element is in an amount of 5-15% by weight, further preferably, the inorganic oxide carrier is in an amount of 72-85% by weight, and on an oxide basis, the first metal element is in an amount of 10-16% by weight, and the second metal element is in an amount of 5-12% by weight.

31. The method according to any one of the preceding items, wherein, the precursor of the inorganic oxide carrier, the precursor of the first metal element and the precursor of the third metal element are used in amounts such that in the obtained composition, based on the total weight of the composition, the inorganic oxide carrier is in an amount of 50-90% by weight, and on an oxide basis, the first metal element is in an amount of 3-30% by weight, and the third metal element is in an amount of 1-20% by weight, preferably, the inorganic oxide carrier is in an amount of 60-90% by weight, and on an oxide basis, the first metal element is in an amount of 5-25% by weight, and the third metal element is in an amount of 2-15% by weight, further preferably, the inorganic oxide carrier is in an amount of 76-86% by weight, and on an oxide basis, the first metal element is in an amount of 10-16% by weight, and the third metal element is in an amount of 2-8% by weight.

32. The method according to any one of the preceding items, wherein, the precursor of the inorganic oxide carrier, the precursor of the first metal element and the precursor of the fourth metal element are used in amounts such that in the obtained composition, based on the total weight of the composition, the inorganic oxide carrier is in an amount of 59.9-94.995% by weight, the first metal element is in an amount of 5-40% by weight on an oxide basis, and the fourth metal element is in an amount of 0.005-0.1% by weight on an element basis, preferably, the inorganic oxide carrier is in an amount of 74.92-91.99% by weight, the first metal element is in an amount of 8-25% by weight on an oxide basis, and the fourth metal element is in an amount of 0.01-0.08% by weight on an element basis, further preferably, the inorganic oxide carrier is in an amount of 83.93-89.95% by weight, the first metal element is in an amount of 10-16% by weight on an oxide basis, and the fourth metal element is in an amount of 0.05-0.07% by weight on an element basis.

33. The method according to any one of the preceding items, wherein, the precursor of the inorganic oxide carrier, the precursor of the first metal element, the precursor of the second metal element and the precursor of the third metal element are used in amounts such that in the obtained composition, based on the total weight of the composition, the inorganic oxide carrier is in an amount of 10-90% by weight, and on an oxide basis, the first metal element is in an amount of 0.5-50% by weight, the second metal element is in an amount of 0.5-20% by weight, and the third metal element is in an amount of 0.5-20% by weight, preferably, the inorganic oxide carrier is in an amount of 50-90% by weight, and on an oxide basis, the first metal element is in an amount of 3-30% by weight, the second metal element is in an amount of 1-20% by weight, and the third metal element is in an amount of 1-10% by weight, further preferably, the inorganic oxide carrier is in an amount of 55-85% by weight, and on an oxide basis, the first metal element is in an amount of 5-25% by weight, the second metal element is in an amount of 5-15% by weight, and the third metal element is in an amount of 2-8% by weight.

34. The method according to any one of the preceding items, wherein, the precursor of the inorganic oxide carrier, the precursor of the first metal element, the precursor of the second metal element and the precursor of the fourth metal element are used in amounts such that in the obtained composition, based on the total weight of the composition, the inorganic oxide carrier is in an amount of 30-90% by weight, and on an oxide basis, the first metal element is in an amount of 0.5-50% by weight, the second metal element is in an amount of 0.5-20% by weight, and on an element basis, the fourth metal element is in an amount of 0.001-0.15% by weight, preferably, the inorganic oxide carrier is in an amount of 50-90% by weight, and on an oxide basis, the first metal element is in an amount of 3-30% by weight, the second metal element is in an amount of 1-20% by weight, and on an element basis, the fourth metal element is in an amount of 0.005-0.1% by weight, further preferably, the inorganic oxide carrier is in an amount of 60-85% by weight, and on an oxide basis, the first metal element is in an amount of 5-25% by weight, the second metal element is in an amount of 2-15% by weight, and on an element basis, the fourth metal element is in an amount of 0.01-0.08% by weight.

35. The method according to any one of the preceding items, wherein, the precursor of the inorganic oxide carrier, the precursor of the first metal element, the precursor of the third metal element and the precursor of the fourth metal element are used in amounts such that in the obtained composition, based on the total weight of the composition, the inorganic oxide carrier is in an amount of 30-90% by weight, and on an oxide basis, the first metal element is in an amount of 0.5-50% by weight, the third metal element is in an amount of 0.5-20% by weight, and on an element basis, the fourth metal element is in an amount of 0.001-0.15% by weight, preferably, the inorganic oxide carrier is in an amount of 50-90% by weight, and on an oxide basis, the first metal element is in an amount of 3-30% by weight, the third metal element is in an amount of 1-20% by weight, and on an element basis, the fourth metal element is in an amount of 0.005-0.1% by weight, further preferably, the inorganic oxide carrier is in an amount of 60-85% by weight, and on an oxide basis, the first metal element is in an amount of 5-25% by weight, the third metal element is in an amount of 2-15% by weight, and on an element basis, the fourth metal element is in an amount of 0.01-0.08% by weight.

36. The method according to any one of the preceding items, wherein, the precursor of the inorganic oxide carrier, the precursor of the first metal element, the precursor of the second metal element, the precursor of the third metal element and the precursor of the fourth metal element are used in amounts such that in the obtained composition, based on the total weight of the composition, the inorganic oxide carrier is in an amount of 10-90% by weight, and on an oxide basis, the first metal element is in an amount of 0.5-50% by weight, the second metal element is in an amount of 0.5-20% by weight, the third metal element is in an amount of 0.5-20% by weight, and on an element basis, the fourth metal element is in an amount of 0.001-0.15% by weight, preferably, the inorganic oxide carrier is in an amount of 50-90% by weight, and on an oxide basis, the first metal element is in an amount of 3-30% by weight, the second metal element is in an amount of 1-20% by weight, the third metal element is in an amount of 1-10% by weight, and on an element basis, the fourth metal element is in an amount of 0.005-0.1% by weight, further preferably, the inorganic oxide carrier is in an amount of 55-85% by weight, and on an oxide basis, the first metal element is in an amount of 5-25% by weight, the second metal element is in an amount of 5-15% by weight, the third metal element is in an amount of 2-8% by weight, and on an element basis, the fourth metal element is in an amount of 0.01-0.08% by weight.

37. The method according to any one of the preceding items, wherein the calcining in step (1) is performed under a carbon-containing atmosphere at a temperature of 400-1000° C., preferably 450-650° C. for 0.1-10 h, preferably 1-3 h;

preferably, the carbon-containing atmosphere is provided by a carbon-element-containing gas, wherein the carbon-element-containing gas is at least one selected from the group consisting of CO, methane and ethane, preferably CO.

38. The method according to any one of the preceding items, wherein the precursor of Fe and the precursor of Co are used in amounts such that the weight ratio of Fe to Co in the obtained composition is 1:(0.3-3), preferably 1:(0.4-2) on an oxide basis.

39. The method according to any one of the preceding items, wherein the method further comprises, after the impregnation of the step (2), performing an alkaline treatment on the solid product before the drying and/or second calcining;

preferably, the alkaline treatment comprises: making a slurry by mixing the solid product and an alkaline solution, or washing the solid product with an alkaline solution;

preferably, the alkaline solution is an alkaline solution of a nonmetallic element, preferably aqueous ammonia and/or a solution of an alkaline ammonium salt;

preferably, the alkaline solution has a concentration of 0.01-10 mol/L, preferably 0.05-5 mol/L;

preferably, the alkaline solution is used in an amount by volume of 1-10 times of the pore volume of the solid product, preferably 1.5-5 times.

40. The method according to any one of the preceding items, wherein the inorganic oxide carrier is at least one selected from the group consisting of alumina, silica-alumina, zeolite, spinel, kaolin, diatomite, perlite and perovskite, preferably at least one selected from the group consisting of alumina, spinel and perovskite, and further preferably alumina;

preferably, before making the slurry, the precursor of alumina is treated by acidic peptization, and further preferably, the acid used in the acidic peptization is hydrochloric acid, and the acidic peptizaiton is performed with a ratio of acid to alumina of 0.12-0.22:1 for 20-40 min.

41. The method according to any one of the preceding items, wherein the second metal element is at least one selected from the group consisting of Na, K, Mg and Ca, preferably K and/or Mg, most preferably Mg;

the third metal element is at least one selected from the group consisting of Cu, Zn, Ti, Zr, V, Cr, Mo, W, Mn and rare earth elements, preferably at least one selected from the group consisting of Zr, V, W, Mn, Ce and La, most preferably Mn;

the fourth metal element is at least one selected from the group consisting of Pt, Ir, Pd, Ru and Rh, most preferably Ru, the precursor of the first metal element, the precursor of the second metal element, the precursor of the third metal element and the precursor of the fourth metal element are selected respectively from the groups consisting of the water-soluble salts of the first metal element, the water-soluble salts of the second metal element, the water-soluble salts of the third metal element and the water-soluble salts of the fourth metal element.

42. A composition capable of reducing CO and NOx emissions obtained by the method according to any one of the preceding items 21-41.

43. A use of the composition capable of reducing CO and NOx emission according to any one of the preceding items 1-20 and 42 in treating a flue gas.

44. A use of the composition capable of reducing CO and NOx emission according to any one of the preceding items 1-20 and 42 in treating the flue gas from the regeneration in a catalytic cracking process.

45. A fluidized catalytic cracking method, comprising: contacting and reacting a hydrocarbon oil with a catalyst, and regenerating the catalyst after the contacting and reacting, wherein the catalyst comprises a catalytic cracking catalyst and a composition capable of reducing CO and NOx emissions, and wherein the composition capable of reducing CO and NOx emissions is the composition capable of reducing CO and NOx emission according to any one of the preceding items 1-20 and 42.

46. The fluidized catalytic cracking method according to item 45, wherein the composition capable of reducing CO and NOx emissions is in an amount of 0.05-5% by weight, preferably 0.1-3% by weight, based on the total weight of the catalyst.

Preferably, the present invention relates to the following items.

1. A composition capable of reducing CO and NOx emissions, comprising: an inorganic oxide carrier and a first metal element supported on the inorganic oxide carrier, wherein the first metal element is selected from the group consisting of the non-noble metal elements of the Group VIII, wherein the first metal element includes Fe and Co, and wherein the weight ratio of Fe to Co is 1:(0.1-10) on an oxide basis.

2. The composition according to item 1, wherein the composition further comprises a second metal element supported on the inorganic oxide carrier, wherein the second metal is at least one selected from the group consisting of the metal elements of the Group IA and/or IIA, and wherein, based on the total weight of the composition, the inorganic oxide carrier is in an amount of 10-90% by weight, and on an oxide basis, the first metal element is in an amount of 0.5-50% by weight, and the second metal element is in an amount of 0.5-20% by weight.

3. The composition according to item 1 or 2, wherein the composition further comprises a third metal element supported on the inorganic oxide carrier, the third metal is at least one selected from the group consisting of the non-noble metal elements of the Groups IB to VIIB, and based on the total weight of the composition, the third metal element is in an amount of 0.5-20% by weight on an oxide basis.

4. The composition according to any one of the preceding items 1-3, wherein the composition further comprises a fourth metal element supported on the inorganic oxide carrier, wherein the fourth metal is at least one selected from the group consisting of noble metal elements, and wherein, based on the total weight of the composition, the fourth metal element is in an amount of 0.001-0.15% by weight on an element basis.

5. The composition according to any one of the preceding items 1-4, wherein the composition comprises an inorganic oxide carrier and a first metal element, a second metal element, a third metal emelent and a fourth metal element supported on the inorganic oxide carrier, and wherein, based on the total weight of the composition, the inorganic oxide carrier is in an amount of 50-90% by weight, and on an oxide basis, the first metal element is in an amount of 3-30% by weight, the second metal element is in an amount of 1-20% by weight, the third metal element is in an amount of 1-10% by weight, and on an element basis, the fourth metal element is in an amount of 0.005-0.1% by weight.

6. The composition according to any one of the preceding items 1-5, wherein the weight ratio of Fe to Co is 1:(0.3-3) on an oxide basis.

7. The composition according to any one of the preceding items 1-6, wherein
at least part of Fe in the composition is presented in a form of iron carbide; and
at least part of Co in the composition is presented in a form of elemental cobalt.

8. The composition according to any one of the preceding items 1-7, wherein the inorganic oxide carrier is at least one selected from the group consisting of alumina, silica-alumina, zeolite, spinel, kaolin, diatomite, perlite and perovskite.

9. The composition according to any one of the preceding items 1-8, wherein the second metal element is at least one selected from the group consisting of Na, K, Mg and Ca;
the third metal element is at least one selected from the group consisting of Cu, Zn, Ti, Zr, V, Cr, Mo, W, Mn and rare earth elements;
the fourth metal element is at least one selected from the group consisting of Pt, Ir, Pd, Ru and Rh.

10. A method for preparing the composition according to item 1, comprising:
(1) making a slurry by mixing a precursor of an inorganic oxide carrier, a precursor of a first metal and water, spray drying the slurry and then calcining to obtain the composition.

11. A method according to item 10, comprising:
(1) making a slurry by mixing a precursor of an inorganic oxide carrier, a precursor of a first metal, a precursor of a second metal and water, spray drying the slurry and then calcining to obtain the composition.

12. A method according to item 10 or 11, comprising:
(1) making a slurry by mixing a precursor of an inorganic oxide carrier, a precursor of a first metal, a precursor of a second metal, a precursor of a third metal and water, spray drying the slurry and then calcining to obtain the composition.

13. A method according to any one of the preceding items 10-12, further comprising:
(2) impregnating the composition obtained in the step (1) in an impregnating solution containing a precursor of a fourth metal element to obtain a solid product, and then drying the solid product and/or performing second calcining.

14. A method according to any one of the preceding items 10-13, wherein the calcining in step (1) is performed under a carbon-containing atmosphere at a temperature of 400-1000° C. for 0.1-10 h.

15. A method according to any one of the preceding items 10-14, wherein the inorganic oxide carrier is alumina; wherein, before making the slurry, the precursor of alumina is treated by acidic peptization, wherein the acid used in the acidic peptization is hydrochloric acid, and wherein the acidic peptization is performed with a ratio of acid to alumina of 0.12-0.22:1 for 20-40 min.

16. A method according to item 13, wherein the method further comprises, after the impregnation of the step (2), performing alkaline treatment on the solid product before the drying and/or second calcining; and wherein the alkaline treatment comprises: making a slurry by mixing the solid product with an alkaline solution, or washing the solid product with an alkaline solution.

17. A use of the composition capable of reducing CO and NOx emission according to any one of the preceding items 1-9 in treating a flue gas.

18. A use of the composition capable of reducing CO and NOx emission according to any one of the preceding items 1-9 in treating the flue gas from the regeneration in a catalytic cracking process.

19. A fluidized catalytic cracking method, comprising: contacting and reacting a hydrocarbon oil with a catalyst, and regenerating the catalyst after the contacting and reacting, wherein the catalyst comprises a catalytic cracking catalyst and a composition capable of reducing CO and NOx emissions, and wherein the composition capable of reducing CO and NOx emissions is the composition capable of reducing CO and NOx emission according to any one of the preceding items 1-9.

20. The fluidized catalytic cracking method according to item 19, wherein the composition capable of reducing CO and NOx emissions is in an amount of 0.05-5% by weight, based on the total weight of the catalyst.

The present invention provides a composition capable of reducing CO and NOx emissions as an additive for a catalytic cracking, which can maintain high hydrothermal stability in the hydrothermal environment of a regenerator, and has high activity of reducing CO and NOx emissions in the regenerated flue gas. In addition, the method for preparing the composition capable of reducing CO and NOx emissions in accordance with the present invention is simple in operation with low production cost. As compared with the FCC process using an existing additive for reducing CO and NOx emissions, the FCC process using the composition capable of reducing CO and NOx emissions in accordance with the present invention uses lower amount of the composition for reducing CO and NOx emissions and has higher activity for reducing CO and NOx emissions.

Other features and advantages of the present invention will be described in detail in the following section of detail description.

BRIEF DESCRIPTION OF THE DRAWINGS

The accompanying drawings are included to provide a further understanding of the invention and are a part of this specification, which, together with the following detail description of the technology, illustrate embodiments of the invention but not intend to limit the scope thereof. In the drawings.

DETAIL DESCRIPTION

Figure 1:
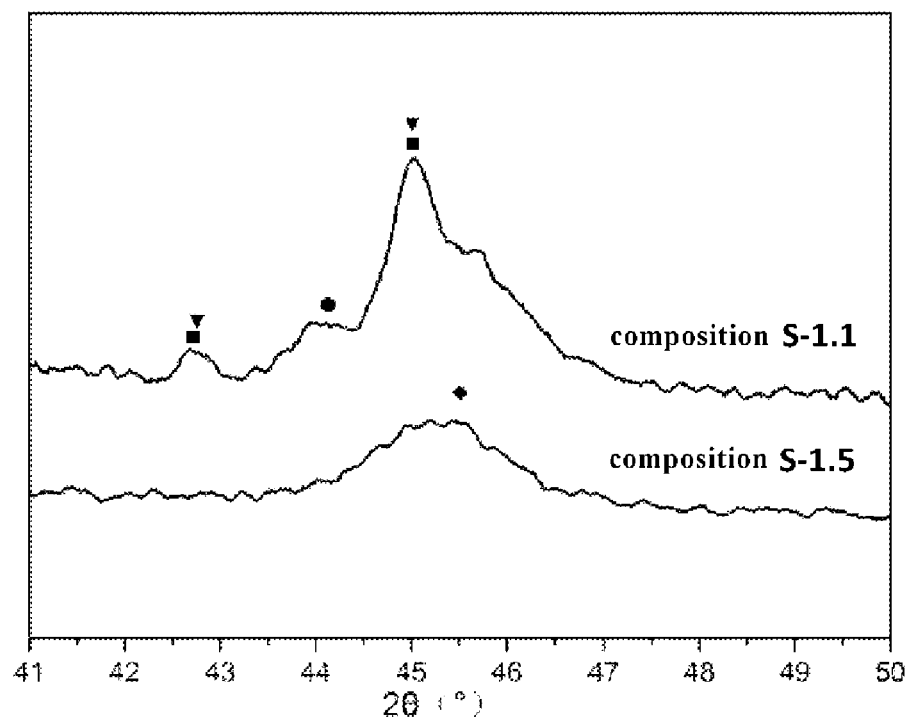
FIG. 1 is the XRD patterns of the compositions capable of reducing CO and NOx emissions obtained in the examples 1.1 and 1.5.

It should be understood that the endpoints and any values in the ranges disclosed herein are not limited to the precise range or value, but to encompass values close to those ranges or values. For ranges of values, it is possible to combine between the endpoints of each of the ranges, between the endpoints of each of the ranges and the individual points, and between the individual points to give one or more new ranges of values as if these ranges of values are specifically disclosed herein.

The invention provides a composition capable of reducing CO and NOx emissions, consisting of an inorganic oxide carrier, and Fe and Co supported on the inorganic oxide carrier, wherein the weight ratio of Fe to Co is 1:(0.1-10) on an oxide basis. In one variant, the invention provides a composition capable of reducing CO and NOx emissions, comprising: an inorganic oxide carrier, and a first metal element and a second metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.1-10) on an oxide basis, and wherein the second metal is at least one selected from the group consisting of the metal elements of the Group IA and/or IIA. In one variant, the invention provides a composition capable of reducing CO and NOx emissions, comprising: an inorganic oxide carrier, and a first metal element and a third metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.1-10) on an oxide basis, and wherein the third metal is at least one selected from the group consisting of the non-noble metal elements of the Groups IB to VIIB. In one variant, the invention provides a composition capable of reducing CO and NOx emissions, comprising: an inorganic oxide carrier, and a first metal element and a fourth metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, and wherein the fourth metal is at least one selected from the group consisting of the noble metal elements. In one variant, the invention provides a composition capable of reducing CO and NOx emissions, comprising: an inorganic oxide carrier, and a first metal element, a second metal element and a third metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, wherein the second metal is at least one selected from the group consisting of the metal elements of the Group IA and/or IIA, and wherein the third metal is at least one selected from the group consisting of the non-noble metal elements of the Groups IB to VIIB. In one variant, the invention provides a composition capable of reducing CO and NOx emissions, comprising: an inorganic oxide carrier, and a first metal element, a second metal element and a fourth metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, wherein the second metal is at least one selected from the group consisting of the metal elements of the Group IA and/or IIA, and wherein the fourth metal is at least one selected from the group consisting of the noble metal elements.

In one variant, the invention provides a composition capable of reducing CO and NOx emissions, comprising: an inorganic oxide carrier, and a first metal element, a third metal element and a fourth metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, wherein the third metal is at least one selected from the group consisting of the non-noble metal elements of the Groups IB to VIIB, and wherein the fourth metal is at least one selected from the group consisting of the noble metal elements. In one variant, the invention provides a composition capable of reducing CO and NOx emissions, comprising: an inorganic oxide carrier, and a first metal element, a second metal element, a third metal element and a fourth metal element supported on the inorganic oxide carrier, wherein the first metal element is selected from the group consisting of the non-noble metal elements of the Group VIII, wherein the first metal element includes Fe and Co, wherein the weight ratio of Fe to Co is 1:(0.05-20) on an oxide basis, wherein the second metal is at least one selected from the group consisting of the metal elements of the Group IA and/or IIA, wherein the third metal is at least one selected from the group consisting of the non-noble metal elements of the Groups IB to VIIB, and wherein the fourth metal is at least one selected from the group consisting of the noble metal elements.

In the inventive composition, the contents of the first metal element, the second metal element, the third metal element and the fourth metal element may be selected over a broad range. In one variant, based on the total weight of the composition, the inorganic oxide carrier is in an amount of 60-95% by weight, and the total of Fe and Co is in an amount of 5-40% by weight on an oxide basis; preferably, the inorganic oxide carrier is in an amount of 75-92% by weight, and the total of Fe and Co is in an amount of 8-25% by weight on an oxide basis; and further preferably, the inorganic oxide carrier is in an amount of 84-90% by weight, and the total of Fe and Co is in an amount of 10-16% by weight on an oxide basis. In one variant, based on the total weight of the composition, the inorganic oxide carrier is in an amount of 50-90% by weight, and on an oxide basis, the first metal element is in an amount of 3-30% by weight, and the second metal element is in an amount of 1-20% by weight; preferably, the inorganic oxide carrier is in an amount of 60-90% by weight, and on an oxide basis, the first metal element is in an amount of 5-25% by weight, and the second metal element is in an amount of 5-15% by weight; and further preferably, the inorganic oxide carrier is in an amount of 72-85% by weight, and on an oxide basis, the first metal element is in an amount of 10-16% by weight, and the second metal element is in an amount of 5-12% by weight. In one variant, based on the total weight of the composition, the inorganic oxide carrier is in an amount of 50-90% by weight, and on an oxide basis, the first metal element is in an amount of 3-30% by weight, and the third metal element is in an amount of 1-20% by weight; preferably, the inorganic oxide carrier is in an amount of 60-90% by weight, and on an oxide basis, the first metal element is in an amount of 5-25% by weight, and the third metal element is in an amount of 2-15% by weight; and further preferably, the inorganic oxide carrier is in an amount of 76-86% by weight, and on an oxide basis, the first metal element is in an amount of 10-16% by weight, and the third metal element is in an amount of 2-8% by weight. In one variant, based on the total weight of the composition, the inorganic oxide carrier is in an amount of 59.9-94.995% by weight, and on an oxide basis, the first metal element is in an amount of 5-40% by weight, and on an element basis, the fourth metal element is in an amount of 0.005-0.1% by weight; preferably, the inorganic oxide carrier is in an amount of 74.92-91.99% by weight, and on an oxide basis, the first metal element is in an amount of 8-25% by weight, and on an element basis, the fourth metal element is in an amount of 0.01-0.08% by weight; and further preferably, the inorganic oxide carrier is in an amount of 83.93-89.95% by weight, and on an oxide basis, the first metal element is in an amount of 10-16% by weight, and on an element basis, the fourth metal element is in an amount of 0.05-0.07% by weight. In one variant, based on the total weight of the composition, the inorganic oxide carrier is in an amount of 10-90% by weight, and on an oxide basis, the first metal element is in an amount of 0.5-50% by weight, the second metal element is in an amount of 0.5-20% by weight, and the third metal element is in an amount of 0.5-20% by weight; preferably, the inorganic oxide carrier is in an amount of 50-90% by weight, and on an oxide basis, the first metal element is in an amount of 3-30% by weight, the second metal element is in an amount of 1-20% by weight, and the third metal element is in an amount of 1-10% by weight; and further preferably, the inorganic oxide carrier is in an amount of 55-85% by weight, and on an oxide basis, the first metal element is in an amount of 5-25% by weight, the second metal element is in an amount of 5-15% by weight, and the third metal element is in an amount of 2-8% by weight. In one variant, based on the total weight of the composition, the inorganic oxide carrier is in an amount of 30-90% by weight, and on an oxide basis, the first metal element is in an amount of 0.5-50% by weight, the second metal element is in an amount of 0.5-20% by weight, and on an element basis, the fourth metal element is in an amount of 0.001-0.15% by weight; preferably, the inorganic oxide carrier is in an amount of 50-90% by weight, and on an oxide basis, the first metal element is in an amount of 3-30% by weight, the second metal element is in an amount of 1-20% by weight, and on an element basis, the fourth metal element is in an amount of 0.005-0.1% by weight; and further preferably, the inorganic oxide carrier is in an amount of 60-85% by weight, and on an oxide basis, the first metal element is in an amount of 5-25% by weight, the second metal element is in an amount of 2-15% by weight, and on an element basis, the fourth metal element is in an amount of 0.01-0.08% by weight. In one variant, based on the total weight of the composition, the inorganic oxide carrier is in an amount of 30-90% by weight, and on an oxide basis, the first metal element is in an amount of 0.5-50% by weight, the third metal element is in an amount of 0.5-20% by weight, and on an element basis, the fourth metal element is in an amount of 0.001-0.15% by weight; preferably, the inorganic oxide carrier is in an amount of 50-90% by weight, and on an oxide basis, the first metal element is in an amount of 3-30% by weight, the third metal element is in an amount of 1-20% by weight, and on an element basis, the fourth metal element is in an amount of 0.005-0.1% by weight; and further preferably, the inorganic oxide carrier is in an amount of 60-85% by weight, and on an oxide basis, the first metal element is in an amount of 5-25% by weight, the third metal element is in an amount of 2-15% by weight, and on an element basis, the fourth metal element is in an amount of 0.01-0.08% by weight. In one variant, based on the total weight of the composition, the inorganic oxide carrier is in an amount of 10-90% by weight, and on an oxide basis, the first metal element is in an amount of 0.5-50% by weight, the second metal element is in an amount of 0.5-20% by weight, the third metal element is in an amount of 0.5-20% by weight, and on an element basis, the fourth metal element is in an amount of 0.001-0.15% by weight; preferably, the inorganic oxide carrier is in an amount of 50-90% by weight, and on an oxide basis, the first metal element is in an amount of 3-30% by weight, the second metal element is in an amount of 1-20% by weight, the third metal element is in an amount of 1-10% by weight, and on an element basis, the fourth metal element is in an amount of 0.005-0.1% by weight; and further preferably, the inorganic oxide carrier is in an amount of 55-85% by weight, and on an oxide basis, the first metal element is in an amount of 5-25% by weight, the second metal element is in an amount of 5-15% by weight, the third metal element is in an amount of 2-8% by weight, and on an element basis, the fourth metal element is in an amount of 0.01-0.08% by weight.

The first metal element of the invention includes Fe and Co. However, the invention does not exclude the cases wherein the first metal element also contains an element other than Fe and Co within the non-noble metal elements of the Group VIII, such as Ni. According to one most preferred embodiment of the invention, the composition comprises an inorganic oxide carrier, and a first metal element and a second metal element supported on the inorganic oxide carrier, wherein the first metal element only consists of Fe and Co.

In the invention, as long as Fe and Co are included in the first metal element, it is possible to improve the catalytic conversion activity of the composition on the reduced nitrides such as $NH_3$ and the like. In order to further take advantage of the synergistic effect of Fe and Co, it is preferred that the weight ratio of Fe to Co is 1:(0.3-3) and further preferably 1:(0.4-2) on an oxide basis.

In the invention, unless specially indicated, the term "on an oxide basis" refers to "on basis of $Fe_2O_3$" for Fe, and to "on basis of $Co_2O_3$" for Co.

According to a preferred embodiment of the invention, at least part of Fe in the composition is presented in a form of iron carbide. Preferably, the iron carbide is $Fe_3C$ and/or $Fe_7C_3$. There is not any special limitation on the amount of iron carbide in the present invention. As long as iron carbide is presented, the performance of the composition capable of reducing CO and NOx emissions can be effectively improved. According to another preferred embodiment of the invention, at least part of Fe in the composition is presented in a form of elemental iron. There is not any special limitation on the amount of elemental iron in the present invention. As long as elemental iron is presented, the performance of the composition capable of reducing CO and NOx emissions can be effectively improved.

According to a preferred embodiment of the invention, at least part of Co in the composition is presented in a form of cobalt monooxide. There is not any special limitation on the amount of cobalt monooxide in the present invention. As long as cobalt monooxide is presented, the performance of the composition capable of reducing CO and NOx emissions can be effectively improved. According to another preferred embodiment of the invention, at least part of Co in the composition is presented in a form of elemental cobalt. There is not any special limitation on the amount of elemental cobalt in the present invention. As long as elemental cobalt is presented, the performance of the composition capable of reducing CO and NOx emissions can be effectively improved.

It should be noted that in the existing composition for reducing CO and NOx emissions, most of the metal elements in the composition are in oxidized state. In the process for preparing the inventive composition, the composition is preferably calcined under a carbon-containing atmosphere, so that part of the iron oxides are converted into iron carbide and/or elemental iron, and part of the cobalt oxides are converted into cobalt monooxide and/or elemental cobalt.

The presence of iron carbide and/or elemental iron and cobalt monooxide and/or elemental cobalt can make the composition better promote the decomposition of the reduced nitrogen-containing compounds, reduce the formation of nitrogen oxides, and promote the reduction of nitrogen oxides to a certain extent.

Preferably, the XRD pattern of the composition in accordance with the present invention includes diffraction peaks at $2\theta$ of 42.6°, 44.2° and 44.9°.

In particular, the diffraction peak at $2\theta$ of 44.9° is the diffraction peak for iron carbide and/or elemental iron; the diffraction peaks at $2\theta$ of 42.6° and 44.2° are the diffraction peaks for cobalt monooxide and/or elemental cobalt.

According to a preferred embodiment of the invention, in the XRD pattern of the inventive composition, the diffraction peak at $2\theta$ of 44.9° is stronger than that at $2\theta$ of 42.6°.

In the inventive composition, the inorganic oxide carrier may be any inorganic oxide carrier commonly used in the art, for example at least one selected from the group consisting of alumina, silica-alumina, zeolite, spinel, kaolin, diatomite, perlite and perovskite. In the invention, the spinel may be any spinel commonly used, for example, at least one selected from the group consisting of magnesium aluminum spinel, zinc aluminum spinel and titanium aluminum spinel.

According to a preferred embodiment of the invention, the inorganic oxide carrier is at least one selected from the group consisting of alumina, spinel and perovskite, and further preferably alumina.

In the invention, the alumina may be at least one selected from the group consisting of γ-alumina, δ-alumina, η-alumina, ρ-alumina, κ-alumina and χ-alumina. There is not any special limitation on it in the invention.

The alumina may be derived from any sol or gel of aluminum, or aluminum hydroxide. The aluminum hydroxide may be at least one selected from the group consisting of gibbsite, paialuminite, nuoshui aluminite, diaspore, boehmite and pseudo boehmite. Preferably, the alumina is derived from pseudo boehmite.

The inorganic oxide carrier may be commercially available or prepared by the existing method.

In the invention, the metal elements of the Group IA include but are not limited to Na and/or K. The metal elements of the Group IIA include but are not limited to at least one of Mg, Ca, Sr and Ba. The non-noble metal elements of the Groups IB to VIIB refer to the non-noble metals in the Group IB to the Group VIIB in the periodic table of elements, including the non-noble metals of the Group IB, the metals of the Group IIB, the metals of the Group IIIB, the metals of the Group IVB, the metals of the Group VB, the metals of the Group VIB and the metals of the Group VIIB. In particular, the non-noble metal elements of the Groups IB to VIIB include but are not limited to at least one of Cu, Zn, Cd, Sc, Y, Ti, Zr, V, Nb, Cr, Mo, W, Mn, Re and rare earth elements. The rare earth elements include but are not limited to at least one of La, Ce, Pr, Nd, Pm, Sm and Eu. The noble metal elements include Au, Ag, Pt, Os, Tr, Ru, Rh and Pd.

Preferably, in the inventive composition, the second metal element is at least one selected from the group consisting of Na, K, Mg and Ca, preferably K and/or Mg, most preferably Mg.

Preferably, in the inventive composition, the third metal element is at least one selected from the group consisting of Cu, Zn, Ti, Zr, V, Cr, Mo, W, Mn and rare earth elements, preferably at least one selected from the group consisting of Zr, V, W, Mn, Ce and La, most preferably Mn.

Preferably, in the inventive composition, the fourth metal element is at least one selected from the group consisting of Pt, Tr, Pd, Ru and Rh, most preferably Ru.

According to a preferred embodiment of the invention, when Fe, Co and Mg are used in combination as the metal elements, it is possible to substantially improve the catalytic conversion activity for the reduced nitrides such as $NH_3$ and the like of the composition capable of reducing CO and NOx emissions. In addition, the composition capable of reducing CO and NOx emissions may advantageously have better hydrothermal stability.

According to an embodiment of the invention, the composition comprises alumina, and Fe, Co and Mg supported on the alumina, wherein the weight ratio of Fe to Co is 1:(0.4-2) on an oxide basis, and based on the total weight of the composition, alumina is in an amount of 72-85% by weight, and on an oxide basis, the total of Fe and Co is in an amount of 10-16% by weight, and Mg is in an amount of 5-12% by weight.

According to another preferred embodiment of the invention, when Fe, Co, Mg and Mn are used in combination as metal elements, it is possible to substantially improve the catalytic conversion activity for the reduced nitrides such as $NH_3$ and the like of the composition capable of reducing CO and NOx emissions. In addition, the composition capable of reducing CO and NOx emissions may advantageously have better hydrothermal stability.

According to another embodiment of the invention, the composition comprises alumina, and Fe, Co, Mg and Mn supported on the alumina, wherein the weight ratio of Fe to Co is 1:(0.5-2) on an oxide basis, and based on the total weight of the composition, alumina is in an amount of 66-85% by weight, and on an oxide basis, the total of Fe and Co is in an amount of 6-16% by weight, Mg is in an amount of 5-12% by weight, and Mn is in an amount of 3-8% by weight.

According to another preferred embodiment of the invention, when Fe, Co, Mg and Ru are used in combination as the active components, it is possible to substantially improve the catalytic conversion activity for the reduced nitrides such as $NH_3$ and the like of the composition capable of reducing CO and NOx emissions. In addition, the composition capable of reducing CO and NOx emissions may advantageously have better hydrothermal stability.

According to another embodiment of the invention, the composition comprises alumina, and Fe, Co, Mg and Ru supported on the alumina, wherein the weight ratio of Fe to Co is 1:(0.4-2) on an oxide basis, and based on the total weight of the composition, alumina is in an amount of 72-85% by weight, and on an oxide basis, the total of Fe and Co is in an amount of 10-16% by weight, Mg is in an amount of 4.9-12% by weight, and on an element basis, Ru is in an amount of 0.05-0.07% by weight.

According to another preferred embodiment of the invention, when Fe, Co, Mg, Mn and Ru are used in combination as the active components, it is possible to substantially improve the catalytic conversion activity for the reduced nitrides such as $NH_3$ and the like of the composition capable of reducing CO and NOx emissions. In addition, the composition capable of reducing CO and NOx emissions may advantageously have better hydrothermal stability.

According to another embodiment of the invention, the composition comprises alumina, and Fe, Co, Mg, Mn and Ru supported on the alumina, wherein the weight ratio of Fe to Co is 1:(0.5-2) on an oxide basis, and based on the total weight of the composition, alumina is in an amount of 66-85% by weight, and on an oxide basis, the total of Fe and Co is in an amount of 6-16% by weight, Mg is in an amount of 5-12% by weight, Mn is in an amount of 3-8% by weight, and on an element basis, Ru is in an amount of 0.05-0.07% by weight.

In the invention, the amount of each component in the composition capable of reducing CO and NOx emissions is measured by X-ray fluorescence spectrometry (The Analytic Method of Petrochemicals (RIPP Experimental Method), Edited by Cuiding Yang, et. al., Science Press, 1990).

The invention further provides a method for preparing a composition capable of reducing CO and NOx emissions, comprising:

making a slurry by mixing a precursor of an inorganic oxide carrier, a precursor of a first metal and water, spray drying the slurry and then calcining;

wherein the precursor of the first metal element includes a precursor of Fe and a precursor of Co, and wherein the precursor of Fe and the precursor of Co are used in amounts such that the weight ratio of Fe to Co in the obtained composition is 1:(0.1-10) on an oxide basis.

The invention further provides a method for preparing a composition capable of reducing CO and NOx emissions, comprising:

making a slurry by mixing a precursor of an inorganic oxide carrier, a precursor of a first metal, a precursor of a second metal and water, spray drying the slurry and then calcining;

wherein the first metal element is selected from the group consisting of the non-noble metal elements of the Group VIII, wherein the first metal element includes Fe and Co, wherein the second metal is at least one selected from the group consisting of the metal elements of the Group IA and/or IIA, and wherein, in the precursor of the first metal element, the precursor of Fe and the precursor of Co are used in amounts such that the weight ratio of Fe to Co in the obtained composition is 1:(0.1-10) on an oxide basis.

The invention further provides a method for preparing a composition capable of reducing CO and NOx emissions, comprising:

making a slurry by mixing a precursor of an inorganic oxide carrier, a precursor of a first metal, a precursor of a second metal, a precursor of a third metal and water, spray drying the slurry and then calcining;

wherein the first metal element is selected from the group consisting of the non-noble metal elements of the Group VIII, wherein the first metal element includes Fe and Co, wherein the second metal is at least one selected from the group consisting of metal elements of the Group IA and/or IIA, wherein the third metal is at least one selected from the group consisting of the non-noble metal elements of the Groups IB to VIIB, and wherein, in the precursor of the first metal element, the precursor of Fe and the precursor of Co are used in amounts such that the weight ratio of Fe to Co in the obtained composition is 1:(0.05-20) on an oxide basis.

The invention further provides a method for preparing a composition capable of reducing CO and NOx emissions, comprising:

(1) making a slurry by mixing a precursor of an inorganic oxide carrier, a precursor of a first metal, a precursor of a second metal and water, spray drying the slurry and then performing first calcining to obtain a semi-finished composition;

(2) impregnating the semi-finished composition obtained in the step (1) in an impregnating solution containing a precursor of a fourth metal element to obtain a solid product, and then drying the solid product and/or performing second calcining, wherein the first metal element is selected from the group consisting of the non-noble metal elements of the Group VIII, wherein the first metal element includes Fe and Co, wherein the second metal is at least one selected from the group consisting of metal elements of the Group IA and/or IIA, wherein the fourth metal is at least one selected from the group consisting of the noble metal elements, and wherein, in the precursor of the first metal element, the precursor of Fe and the precursor of Co are used in amounts such that the weight ratio of Fe to Co in the obtained composition is 1:(0.05-20) on an oxide basis.

The invention further provides a method for preparing a composition capable of reducing CO and NOx emissions, comprising:

(1) making a slurry by mixing a precursor of an inorganic oxide carrier, a precursor of a first metal, a precursor of a second metal, a precursor of a third metal, and water, spray drying the slurry and then performing first calcining to obtain a semi-finished composition;

(2) impregnating the semi-finished composition obtained in the step (1) in an impregnating solution containing a precursor of a fourth metal element to obtain a solid product, and then drying the solid product and/or performing second calcining, wherein the first metal element is selected from the group consisting of the non-noble metal elements of the Group VIII, wherein the first metal element includes Fe and Co, wherein the second metal is at least one selected from the group consisting of the metal elements of the Group IA and/or IIA, wherein the third metal is at least one selected from the group consisting of the non-noble metal elements of the Groups IB to VIIB, wherein the fourth metal is at least one selected from the group consisting of the noble metal elements, and wherein, in the precursor of the first metal element, the precursor of Fe and the precursor of Co are used in amounts such that the weight ratio of Fe to Co in the obtained composition is 1:(0.05-20) on an oxide basis.

In the invention, the precursor of the inorganic oxide carrier may include any materials from which the inorganic oxide carrier is obtainable by the subsequent calcining. There is not any special limitation on it in the invention.

In the inventive preparation methods, the inorganic oxide carrier, the first metal element, the second metal element, the third metal element and the fourth metal element are selected as described above, which will not be described here again.

In the invention, the precursor of alumina may be selected from the group consisting of various sols or gels of aluminum, and aluminum hydroxide. The aluminum hydroxide may be at least one selected from the group consisting of gibbsite, paialuminite, nuoshui aluminite, diaspore, boehmite and pseudo boehmite. Most preferably, the precursor of alumina is pseudo boehmite.

In the inventive preparation methods, before making the slurry, the precursor of alumina may be treated by acidic peptization. The acidic peptization may be carried out according to the conventional means in the art. Further preferably, the acid used in the acidic peptization is hydrochloric acid In the invention, the conditions for the acidic peptization may be selected in a broad scope. Preferably, the acidic peptization may be performed with a ratio of acid to alumina of 0.12-0.22:1 for 20-40 min.

In the invention, unless specially indicated, the ratio of acid to alumina refers to the mass ratio of hydrochloric acid in terms of concentrated hydrochloric acid having a concentration of 36% by weight to the precursor of alumina in dry basis.

The acidic peptization may be carried out by adding pseudo boehmite into water and dispersing to make a slurry, then adding hydrochloric acid to acidize for 30 min, wherein the ratio of acid to alumina is 0.18.

In the invention, the precursor of the first metal element, the precursor of the second metal element, the precursor of the third metal element and the precursor of the fourth metal element are selected respectively from the group consisting of water-soluble salts of the first metal element, the second metal element, the third metal element and the fourth metal element, such as nitrates, chlorides, chlorates or sulfates and the like. There is not any special limitation on it in the invention.

In the inventive preparation method, the amounts of the first metal element, the second metal element, the third metal element and the fourth metal element may be selected over a broad range.

In one variant, the precursor of the inorganic oxide carrier and the precursor of the first metal element are used in amounts such that in the obtained composition, based on the total weight of the composition, the inorganic oxide carrier is in an amount of 60-95% by weight, and the total of Fe and Co is in an amount of 5-40% by weigh on an oxide basis. Preferably, the inorganic oxide carrier is in an amount of 75-92% by weight, and the total of Fe and Co is in an amount of 8-25% by weight on an oxide basis. Further preferably, the inorganic oxide carrier is in an amount of 84-90% by weight, and the total of Fe and Co is in an amount of 10-16% by weight on an oxide basis.

In one variant, the precursor of the inorganic oxide carrier, the precursor of the first metal element and the precursor of the second metal element are used in amounts such that in the obtained composition, based on the total weight of the composition, the inorganic oxide carrier is in an amount of 50-90% by weight, and on an oxide basis, the first metal element is in an amount of 3-30% by weight, and the second metal element is in an amount of 1-20% by weight. Preferably, the inorganic oxide carrier is in an amount of 60-90% by weight, and on an oxide basis, the first metal element is in an amount of 5-25% by weight, and the second metal element is in an amount of 5-15% by weight. Further preferably, the inorganic oxide carrier is in an amount of 72-85% by weight, and on an oxide basis, the first metal element is in an amount of 10-16% by weight, and the second metal element is in an amount of 5-12% by weight.

In one variant, the precursor of the inorganic oxide carrier, the precursor of the first metal element, the precursor of the second metal element and the precursor of the third metal element are used in amounts such that in the obtained composition, based on the total weight of the composition, the inorganic oxide carrier is in an amount of 10-90% by weight, and on an oxide basis, the first metal element is in an amount of 0.5-50% by weight, the second metal element is in an amount of 0.5-20% by weight, and the third metal element is in an amount of 0.5-20% by weight. Preferably, the inorganic oxide carrier is in an amount of 50-90% by weight, and on an oxide basis, the first metal element is in an amount of 3-30% by weight, the second metal element is in an amount of 1-20% by weight, and the third metal element is in an amount of 1-10% by weight. Further preferably, the inorganic oxide carrier is in an amount of 55-85% by weight, and on an oxide basis, the first metal element is in an amount of 5-25% by weight, the second metal element is in an amount of 5-15% by weight, and the third metal element is in an amount of 2-8% by weight.

In one variant, the precursor of the inorganic oxide carrier, the precursor of the first metal element, the precursor of the second metal element and the precursor of the fourth metal element are used in amounts such that in the obtained composition, based on the total weight of the composition, the inorganic oxide carrier is in an amount of 30-90% by weight, and on an oxide basis, the first metal element is in an amount of 0.5-50% by weight, the second metal element is in an amount of 0.5-20% by weight, and on an element basis, the fourth metal element is in an amount of 0.001-0.15% by weight. Preferably, the inorganic oxide carrier is in an amount of 50-90% by weight, and on an oxide basis, the first metal element is in an amount of 3-30% by weight, the second metal element is in an amount of 1-20% by weight, and on an element basis, the fourth metal element is in an amount of 0.005-0.1% by weight. Further preferably, the inorganic oxide carrier is in an amount of 60-85% by weight, and on an oxide basis, the first metal element is in an amount of 5-25% by weight on an oxide basis, the second metal element is in an amount of 2-15% by weight on an oxide basis, and on an element basis the fourth metal element is in an amount of 0.01-0.08% by weight.

In one variant, the precursor of the inorganic oxide carrier, the precursor of the first metal element, the precursor of the second metal element, the precursor of the third metal element and the precursor of the fourth metal element are used in amounts such that in the obtained composition, based on the total weight of the composition, the inorganic oxide carrier is in an amount of 10-90% by weight, and on an oxide basis, the first metal element is in an amount of 0.5-50% by weight, the second metal element is in an amount of 0.5-20% by weight, the third metal element is in an amount of 0.5-20% by weight, and on an element basis, the fourth metal element is in an amount of 0.001-0.15% by weight. Preferably, the inorganic oxide carrier is in an amount of 50-90% by weight, and on an oxide basis, the first metal element is in an amount of 3-30% by weight, the second metal element is in an amount of 1-20% by weight, the third metal element is in an amount of 1-10% by weight, and on an element basis, the fourth metal element is in an amount of 0.005-0.1% by weight. Further preferably, the inorganic oxide carrier is in an amount of 55-85% by weight, and on an oxide basis, the first metal element is in an amount of 5-25% by weight, the second metal element is in an amount of 5-15% by weight, the third metal element is in an amount of 2-8% by weight, and on an element basis, the fourth metal element is in an amount of 0.01-0.08% by weight.

Preferably, in the inventive method for preparing the composition capable of reducing CO and NOx emissions, the mass ratio of the amount of the precursor of the inorganic oxide carrier on an oxide basis, the amount of the precursor of the first metal element on an oxide basis of the non-noble metal elements of the Group VIII, and the amount of the precursor of the second metal element on an oxide basis of the metal elements of the Group IA and/or IIA may be 50-90:3-30:1-20; preferably 60-90:5-25:5-15, and further preferably 72-85:10-16:5-12. Preferably, the mass ratio of the amount of the precursor of the inorganic oxide carrier on an oxide basis, the amount of the precursor of the first metal element on an oxide basis of the non-noble metal elements of the Group VIII, the amount of the precursor of the second metal element on an oxide basis of the metal elements of the Group IA and/or IIA and the amount of the precursor of the third metal element on an oxide basis of the non-noble metal elements of the Groups IB to VIIB may be 10-90:0.5-50:0.5-20:0.5-20; preferably 50-90:3-30:1-20:1-10; further preferably 55-85:5-25:5-15:2-8; and more preferably 66-85:6-16:5-12:3-8. Preferably, the mass ratio of the amount of the precursor of the inorganic oxide carrier on an oxide basis, the amount of the precursor of the first metal element on an oxide basis of the non-noble metal elements of the Group VIII, the amount of the precursor of the second metal element on an oxide basis of the metal elements of the Group IA and/or IIA and the amount of the precursor of the fourth metal element on the noble element basis may be 30-90: 0.5-50:0.5-20:0.001-0.15; preferably 50-90:3-30:1-20: 0.005-0.1; further preferably 60-85:5-25:2-15:0.01-0.08; and more preferably 72-85:10-16:4.9-12:0.05-0.07. Preferably, the mass ratio of the amount of the precursor of the inorganic oxide carrier on an oxide basis, the amount of the precursor of the first metal element on an oxide basis of the non-noble metal elements of the Group VIII, the amount of the precursor of the second metal element on an oxide basis of the metal elements of the Group IA and/or IIA, the amount of the precursor of the third metal element on an oxide basis of the non-noble metal elements of the Groups IB to VIIB, and the amount of the precursor of the fourth metal element on an element basis of the noble elements may be 10-90:0.5-50:0.5-20:0.5-20:0.001-0.15, preferably 50-90:3-30:1-20:1-10:0.005-0.1; further preferably, 55-85: 5-25:5-15:2-8:0.01-0.08, and more preferably 66-85:6-16: 5-12:3-8:0.05-0.07.

In the invention, the precursor of the first metal element comprises at least a precursor of Fe and a precursor of Co.

According to a preferable embodiment of the invention, in the precursor of the first metal element, the precursor of Fe and the precursor of Co are used in amounts such that the weight ratio of Fe to Co in the obtained composition be 1:(0.3-3), preferably 1:(0.4-2) on an oxide basis.

In the invention, it is preferred that the solid content of the slurry is 8-30% by weight.

In the invention, there is not any special limitation on the method for making a slurry by mixing the precursor of the inorganic oxide carrier, the precursor of the first metal element, the precursor of the second metal element, the precursor of the third metal element and water. There is not any special limitation on the order of adding the precursor of the inorganic oxide carrier, the precursor of the first metal element, the precursor of the second metal element and the precursor of the third metal element, as long as the precursor of the inorganic oxide carrier, the precursor of the first metal element, the precursor of the second metal element and the precursor of the third metal element are contacted with water. Preferably, the precursor of the first metal element and the precursor of the third metal element are dissolved in water, to which the precursor of the inorganic oxide carrier is added (preferably the precursor of the inorganic oxide carrier is acidized) to obtain a first solution. The precursor of the second metal element is mixed with water to obtain a second solution. The first solution and the second solution are mixed to obtain the slurry.

In the invention, the spray drying may be carried out according to the conventional means in the art without any special limitation. Preferably, the spray drying is performed under conditions which are capable of making the spray dried particles have an average particle size of 60-75 μm and a main particle size of 20-100 μm. Further preferably, the spray drying is performed under conditions which are capable of making more than 50% of the spray dried particles have a particle size of 40-80 μm.

In the invention, even by calcining with the conventional technical means in the art, it is possible to improve the catalytic conversion activity for the reduced nitrides such as $NH_3$ and the like of the composition capable of reducing CO and NOx emissions. However, in order to further improve the catalytic conversion activity for the reduced nitrides such as $NH_3$ and the like and hydrothermal stability of the composition capable of reducing CO and NOx emissions, the calcining is preferably carried out under a carbon-containing atmosphere. The inventors of the invention have surprisingly found during the study that, calcining under the carbon-containing atmosphere can significantly improve the catalytic conversion activity for the reduced nitrides such as $NH_3$ and the like and hydrothermal stability of the composition capable of reducing CO and NOx emissions. In addition, calcining under the carbon-containing atmosphere is more favorable for adjusting the relationship between the active metal components and the carrier. The improvement on activity may be related to the conversion of active components from oxides to carbides in reduced state, while the improvement on hydrothermal stability may be related to the fact that the treatment under the carbon-containing atmosphere at high temperature facilitates the adhesion, fusion and cross-linking of active components in the composition. It can be seen from the comparison of the XRD spectrums that there are obvious peaks of iron carbide and elemental cobalt after the treatment.

In particular, as shown in FIG. 1, there is a diffraction peak at 45.5° for $Al_2O_3$ and $Co_2AlO_4$ in the XRD spectrum of the composition S-1.5 which was not subjected to the treatment under a carbon-containing atmosphere. In the XRD spectrum of the composition S-1.1 which was subjected to the treatment under a carbon-containing atmosphere, there are not only a diffraction peak at 45.5° for $Al_2O_3$ and $Co_2AlO_4$, but also obvious diffraction peaks at about 42.6°, 44.2° and 45.0°, which may be attributable to the fact that the composition S-1.1 subjected to the treatment under a carbon-containing atmosphere has a diffraction peak at 2θ of 44.9° for FeC ($Fe_3C$ and $Fe_7C_3$) and elemental iron. In addition, as compared with the composition S-1.5, the composition S-1.1 has diffraction peaks at 2θ of 42.6° and 44.2° for cobalt monooxide and elemental cobalt.

Figure 2:
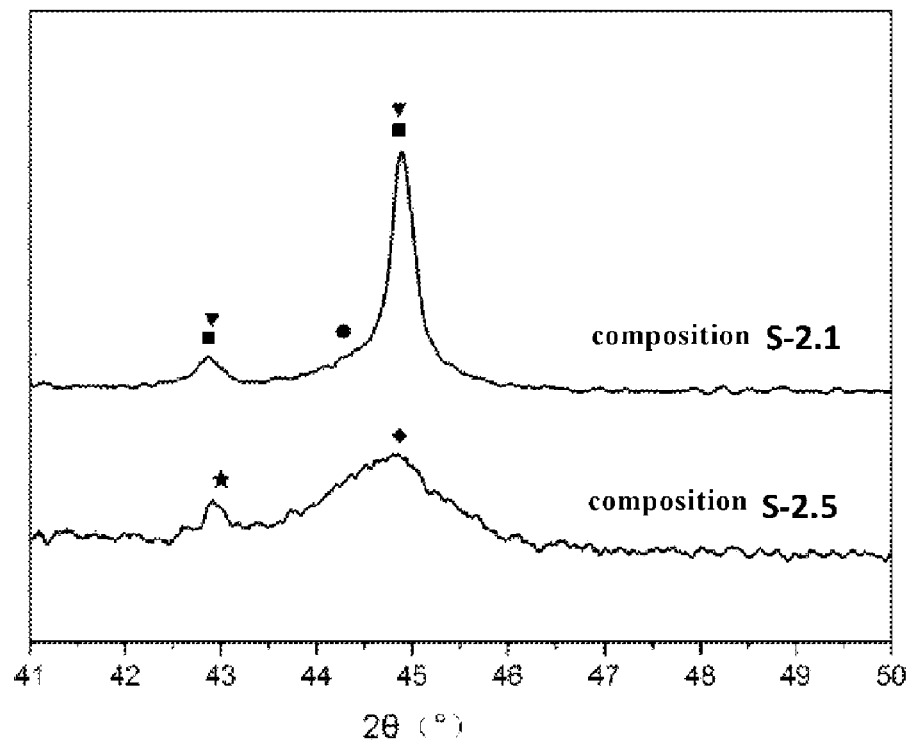
FIG. 2 is the XRD patterns of the compositions capable of reducing CO and NOx emissions obtained in the examples 2.1 and 2.5.

As shown in FIG. 2, there are a diffraction peak at about 43.0° for MgO and a diffraction peak at about 45.0° for $Al_2O_3$, $Co_2AlO_4$ and $MgAl_2O_4$ in the XRD spectrum of the composition S-2.5 which was not subjected to the treatment under a carbon-containing atmosphere. In the XRD spectrum of the composition S-2.1 which was subjected to the treatment under a carbon-containing atmosphere, not only there are a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shift to the left, and the diffraction peak at about 45.0° becomes stronger, which may be attributable to the fact that the composition S-2.1 subjected to the treatment under a carbon-containing atmosphere has a diffraction peak at 2θ of 44.9° for FeC ($Fe_3C$ and $Fe_7C_3$) and elemental iron. In addition, as compared with the composition S-2.5, the composition S-2.1 has diffraction peaks at 2θ of 42.6° and 44.2° for cobalt monooxide and elemental cobalt.

Figure 3:
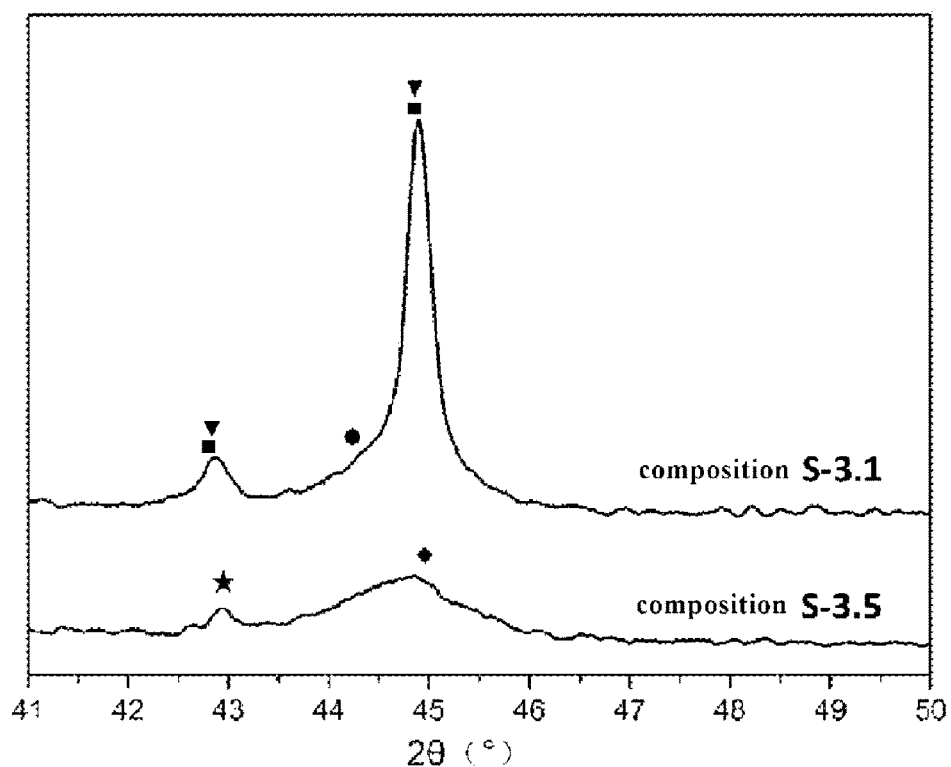
FIG. 3 is the XRD patterns of the compositions capable of reducing CO and NOx emissions obtained in the examples 3.1 and 3.5.

As shown in FIG. 3, there are a diffraction peak at about 43.0° for MgO and a diffraction peak at about 45.0° for $Al_2O_3$, $Co_2AlO_4$ and $MgAl_2O_4$ in the XRD spectrum of the composition S-3.5 which was not subjected to the treatment under a carbon-containing atmosphere. In the XRD spectrum of the composition S-3.1 which was subjected to the treatment under a carbon-containing atmosphere, not only there are a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° become substantially stronger and shift to the left, which may be attributable to the fact that the composition S-3.1 subjected to the treatment under a carbon-containing atmosphere has a diffraction peak at 2θ of 44.9° for FeC ($Fe_3C$ and $Fe_7C_3$) and elemental iron. In addition, as compared with the composition S-3.5, the composition S-3.1 has diffraction peaks at 2θ of 42.6° and 44.2° for cobalt monooxide and elemental cobalt.

Figure 4:
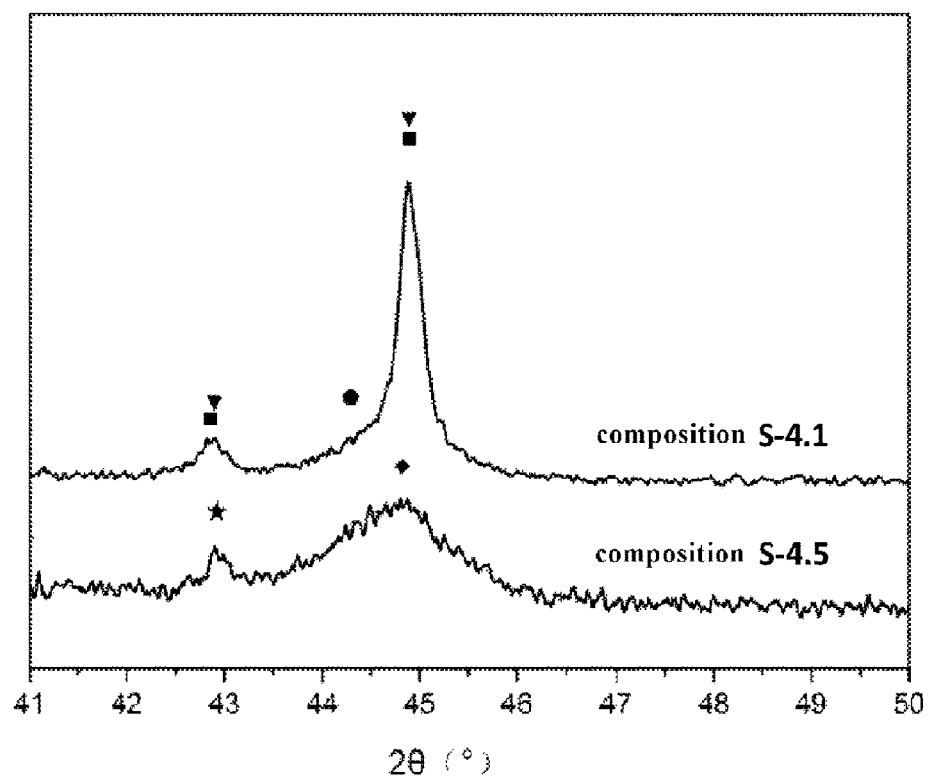
FIG. 4 is the XRD patterns of the compositions capable of reducing CO and NOx emissions obtained in the examples 4.1 and 4.5.

As shown in FIG. 4, there are a diffraction peak at about 43.0° for MgO and a diffraction peak at about 45.0° for $Al_2O_3$, $Co_2AlO_4$ and $MgAl_2O_4$ in the XRD spectrum of the composition S-4.5 which was not subjected to the treatment under a carbon-containing atmosphere. In the XRD spectrum of the composition S-4.1 which was subjected to the treatment under a carbon-containing atmosphere, not only there are a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° become substantially stronger and shift to the left, which may be attributable to the fact that the composition S-4.1 subjected to the treatment under a carbon-containing atmosphere has a diffraction peak at 2θ of 44.9° for FeC ($Fe_3C$ and $Fe_7C_3$) and elemental iron. In addition, as compared with the composition S-4.5, the composition S-4.1 has diffraction peaks at 2θ of 42.6° and 44.2° for cobalt monooxide and elemental cobalt.

Figure 5:
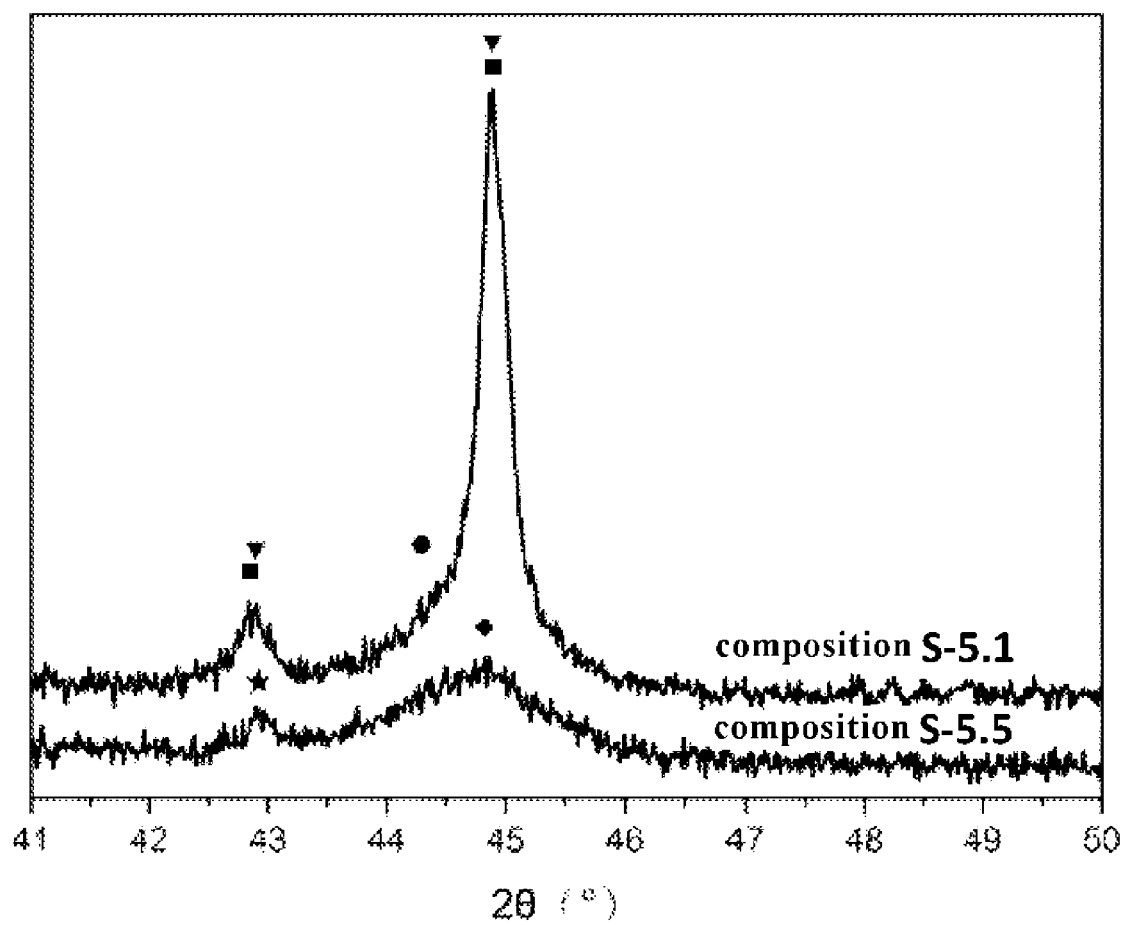
FIG. 5 is the XRD patterns of the compositions capable of reducing CO and NOx emissions obtained in the examples 5.1 and 5.5.

As shown in FIG. 5, there are a diffraction peak at about 43.0° for MgO and a diffraction peak at about 45.0° for $Al_2O_3$, $Co_2AlO_4$ and $MgAl_2O_4$ in the XRD spectrum of the composition S-5.5 which was not subjected to the treatment under a carbon-containing atmosphere. In the XRD spectrum of the composition S-5.1 which was subjected to the treatment under a carbon-containing atmosphere, not only there are a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° become substantially stronger and shift to the left, which may be attributable to the fact that the composition S-5.1 subjected to the treatment under a carbon-containing atmosphere has a diffraction peak at 2θ of 44.9° for FeC ($Fe_3C$ and $Fe_7C_3$) and elemental iron. In addition, as compared with the composition S-5.5, the composition S-5.1 has diffraction peaks at 2θ of 42.6° and 44.2° for cobalt monooxide and elemental cobalt.

It should be noted that FIGS. 1-5 only show the XRD spectrum in the range of 41°-50°, which is mainly used to show the forms of Fe and Co presented in the composition. In the ranges out of 41°-50°, there are other diffraction peaks, for example, at 2θ of 31°, 37°, 59° and 65° for spinel, $Fe_3O_4$, $Co_3O_4$ and the like, which are not further explained in the invention.

According to a preferred embodiment of the invention, the calcining is performed under a carbon-containing atmosphere at a temperature of 400-1000° C., preferably 450-650° C., for 0.1-10 h, preferably 1-3 h There is not any special limitation on the pressure used during the calcining. The calcining may be performed under an normal pressure, for example, 0.01-1 MPa (absolute pressure).

In the invention, the carbon-containing atmosphere is provided by a carbon-element-containing gas. Preferably, the carbon-element-containing gas is selected from the group consisting of carbon-element-containing gases having reductivity, further preferably at least one selected from the group consisting of CO, methane and ethane, most preferably CO.

In the invention, the carbon-element-containing gas may further comprise part of air and/or inert gas, wherein the inert gas may be various inert gases commonly used in the art. Preferably, the inert gas is at least one selected from the group consisting of nitrogen, argon and helium, and further preferably nitrogen.

According to a preferred embodiment of the invention, the carbon-containing atmosphere is provided by a mixed gas containing CO and nitrogen, wherein the volume concentration of CO in the carbon-containing atmosphere is preferably 1-20%, further preferably 4-10%. By using the preferred embodiment of the invention, not only the processing requirements may be better satisfied, but also the safety of operators may be ensured.

In the invention, the calcining may be operated in a calcination furnace, which may be a rotary calcination furnace used in the production of catalytic cracking catalysts and promoters. The carbon-element-containing gas contacts the solid material in the calcination furnace in countercurrent.

In the inventive preparation method, there is not any special limitation on the impregnation in the step (2), which may be operated according to the conventional means in the art, and may be saturated impregnation or excessive impregnation, preferably excessive impregnation.

According to an embodiment of the invention, the semi-finished composition may be added to water first, followed by adding a solution of the precursor of the fourth metal element and stirring.

In the invention, the mixture obtained after the impregnation may be filtered to obtain a solid product. The filtration may be operated according to the conventional means in the art.

In the inventive preparation method, preferably, the method further comprises, after the impregnation of the step (2), performing an alkaline treatment on the solid product before the drying and/or second calcining. By the preferred embodiment of the invention, the alkaline treatment after the impregnation with the noble metal element enables the noble metal element (i.e. the fourth metal element) to be more closely combined with the first metal element, the second metal element and the third metal element, which is more advantageous for the synergistic effects of the four elements, and for the improvement of the catalytic activity for the reduced nitrides such as $NH_3$ and the like and the hydrothermal stability of the composition capable of reducing CO and NOx emissions.

According to an embodiment of the invention, the alkaline treatment comprises: making a slurry by mixing the solid product and an alkaline solution, or washing the solid product with an alkaline solution In the invention, the alkaline solution may be selected over a broad scope. Preferably, the alkaline solution is an alkaline solution of a nonmetallic element, more preferably aqueous ammonia and/or a solution of an alkaline ammonium salt. The solution of the alkaline ammonium salt may be at least one of an ammonium carbonate solution, an ammonium bicarbonate solution and a diammonium hydrogen phosphate solution. In the invention, most preferably, the alkaline solution is aqueous ammonia.

In the invention, the concentration and amount of the alkaline solution may be selected over a broad scope. For example, the alkaline solution may have a concentration of 0.01-10 mol/L, preferably 0.05-5 mol/L, further preferably 0.5-2 mol/L. The alkaline solution may be used in an amount by volume of 1-10 times, preferably 1.5-5 times of the pore volume of the solid product.

Those skilled persons in the art may select the concentration and amount of the alkaline solution according to the pore volume of the obtained solid product. For example, according to an embodiment of the invention, when the pore volume of the obtained solid product is about 0.4-0.5 ml/g, and the amount of the solid product to be treated is 100 g, 60-250 mL of a 0.5-2 mol/l aqueous ammonia solution may be used.

In the inventive step (2), the solid product may be dried only, second calcined only, or dried and then second calcined. There is not any special limitation on it in the invention. Preferably, the solid product is dried and then second calcined. There is not any special limitation on the conditions of the drying and the second calcining in the invention. They may be operated according to the conventional means in the art. For example, the drying may be operated at a temperature of 60-150° C. for 2-10 h.

There is not any special limitation on the second calcining in the invention. The second calcining may be operated under air or an inert atmosphere (such as nitrogen). There is not any special limitation on it in the invention. For example, the second calcining may be operated at a temperature of 300-550° C. for 1-10 h.

The invention further provides a composition capable of reducing CO and NOx emissions prepared by the above mentioned method.

The composition capable of reducing CO and NOx emissions prepared by the above mentioned method comprises Fe, Co, and optionally, at least one of the second metal element, the third metal element and the fourth metal element. By using such metal elements in combination, it is possible to substantially improve the catalytic conversion activity for the reduced nitrides such as $NH_3$ and the like of the composition capable of reducing CO and NOx emissions. In addition, the composition capable of reducing CO and NOx emissions may have better hydrothermal stability.

The invention further provides a use of the composition capable of reducing CO and NOx emissions in treating a flue gas. The inventive composition may be used for treating any flue gas that needs to reduce CO and NOx emissions.

The invention further provides a use of the composition capable of reducing CO and NOx emissions in treating the flue gas from the regeneration in a catalytic cracking progress. The inventive composition capable of reducing CO and NOx emissions is particularly suitable for reducing CO and NOx emissions in the flue gas from the complete regeneration and the incomplete regeneration. The inventive composition capable of reducing CO and NOx emissions is more suitable for reducing CO and NOx emissions in the flue gas from the incomplete regeneration. Therefore, the invention provides a use of the above composition capable of reducing CO and NOx emissions in treating the flue gas from the incomplete regeneration in a catalytic cracking progress.

The invention further provides a fluidized catalytic cracking method, comprising: contacting and reacting a hydrocarbon oil with a catalyst, and regenerating the catalyst after the contacting and reacting, wherein the catalyst comprises a catalytic cracking catalyst and a composition capable of reducing CO and NOx emissions, and wherein the composition capable of reducing CO and NOx emissions is the invention composition capable of reducing CO and NOx emissions mentioned above.

In the inventive fluidized catalytic cracking method, preferably, the composition capable of reducing CO and NOx emissions is in an amount of 0.05-5% by weight, preferably 0.1-3% by weight, further preferably 0.5-2.5% by weight, based on the total weight of the catalyst.

In the inventive fluidized catalytic cracking method, preferably, the hydrocarbon oil is contacted and reacted with the catalyst, and then the catalyst after the contacting and reacting is regenerated incompletely. Further preferably, the concentration of oxygen in the flue gas formed in the incomplete regeneration is no more than 0.5% by volume.

There is not any special limitation on the hydrocarbon oil in the invention. It may be any hydrocarbon oils conventional treated in the field of catalytic cracking, such as a vacuum gas oil, an atmospheric residue, a vacuum residue, a deasphalting oil, a coker gas oil or a hydrotreating oil.

There is not any special limitation on the catalytic cracking catalyst in the invention. It may be any of the existing catalytic cracking catalysts, which may be commercially available or prepared according to the existing methods.

The inventive composition capable of reducing CO and NOx emissions may be independent particles or as a part of the whole catalytic cracking catalyst particles. Preferably, the inventive composition capable of reducing CO and NOx emissions are used as independent particles in combination with the catalytic cracking catalyst particles.

In the invention, unless specially indicated, the term "ppm" is a concentration by volume.

In the inventive fluid catalytic cracking method, there is not any special limitation on the method for regenerating the catalyst, as compared with the existing regeneration method, and the method for regenerating the catalyst may include partial regeneration, incomplete regeneration and complete regeneration operation modes. For the regeneration method, please refer to "catalytic cracking process and engineering", Edited by Junwu Chen, Sinopec press, page 1234-1343, 2005. Preferably, the temperature of the regeneration is 650° C.-730° C.

The implementation and beneficial effects of the invention will be described in detail through the following examples, which intend to help the reader better understand the spirit of the invention, but not intend to limit the practicable scope of the invention.

In the examples, the amount of each component in the composition capable of reducing CO and NOx emissions is measured by X-ray fluorescence spectrometry (XRF). Please refer to "The Analytic Method of Petrochemicals (RIPP Experimental Method", Edited by Cuiding Yang, et. al., Science Press, 1990). In the examples, the XRD spectrum of the composition capable of reducing CO and NOx emissions was measured on a X-ray diffractometer (Siemens D5005) to determine the structure. The conditions thereof included: Cu target, Kα radiation, solid detector, tube voltage of 40 kV, tube current of 40 mA.

The raw materials used in the examples and the comparative examples included: cobalt nitrate [$Co(NO_3)_2 \cdot 6H_2O$] in analytical pure, iron nitrate [$Fe(NO_3)_3 \cdot 9H_2O$] in analytical pure, potassium permanganate ($KMnO_4$) in analytical pure, magnesium oxide [MgO] in analytical pure, all available from Sinopharm Group Chemical Reagent Co., Ltd.; ruthenium chloride ($RuCl_3$) in analytical pure, with a Ru content≥37%, available from GRIKIN Advanced Material Co., Ltd; pseudo boehmite, an industrial grade product, with an alumina content of 64% by weight and pore volume of 0.31 ml/g, produced by Shandong Company of Aluminum Corporation of China Limited; hydrochloric acid, with a concentration of 36.5% by weight, analytical pure, available from Beijing chemical works; aqueous ammonia, with a concentration of 25-28%, analytical pure, available from Beijing chemical works, diluting before using; carbon monoxide, with a concentration of 10% by volume, with nitrogen as balance gas, available from Beijing AP BAIF gas Industrial Co., Ltd.; catalytic cracking catalyst, an industrial product (Cat-A, catalyst brand: CGP-1), with $Na_2O$ content of 0.24 weight %, $Re_2O_3$ content of 3.2 weight %, and $Al_2O_3$ content of 48.0 weight %, average particle size of 67 μm, available from Sinopec catalyst Co., Ltd.

EXAMPLE 1.1

(1) 2.62 kg pseudo boehmite was added to 14.2 kg deionized water and dispersed to make a slurry. To the slurry, 238 mL hydrochloric acid was added to acidize for 15 min, to obtain an alumina gel. On metal oxide basis, 100 g iron nitrate (calculated in $Fe_2O_3$, the same below) and 100 g cobalt nitrate (calculated in $Co_2O_3$, the same below) were added to 3500 mL water, stirred until fully dissolved, and then the alumina gel was added thereto, stirred for another 20 min to obtain a slurry. The slurry was spray dried. 100 g of the particles obtained by spray drying (with an average particle size being 65 μm and the particles having a particle size of 40-80 μm being in an amount of 60%, the same below) were weighted and transferred to a tubular furnace. A $CO/N_2$ mixture gas with a CO concentration of 10 volume % was introduced to the tubular furnace at a flow rate of 100 mL/min. The treatment was operated at 600° C. for 1.5 h to obtain the composition S-1.1.

The test results of the content of each component in the composition S-1.1 were listed in Table 1.1.

The composition S-1.1 was analyzed by XRD, and the XRD spectrum was shown in FIG. 1. As shown in FIG. 1, there was a diffraction peak at 45.5° for $Al_2O_3$ and $Co_2AlO_4$ in the XRD spectrum of the composition S-1.5 which was not subjected to the treatment under a carbon-containing atmosphere. In the XRD spectrum of the composition S-1.1 which was subjected to the treatment under a carbon-containing atmosphere, there were not only a diffraction peak at 45.5° for $Al_2O_3$ and $Co_2AlO_4$, but also obvious diffraction peaks at about 42.6° and about 45.0°, which might be attributable to the fact that the composition S-1.1 subjected to the treatment under a carbon-containing atmosphere had a diffraction peak at 2θ of 44.9° for FeC (Fe$_3$C and Fe$_7$C$_3$) and elemental iron. In addition, as compared with the composition S-1.5, the composition S-1.1 had diffraction peaks at 2θ of 42.6° and 44.2° for cobalt monooxide and elemental cobalt.

It should be noted that the figures only show the XRD spectrum in the range of 41°-50° and were mainly used to show the forms of Fe and Co presented in the composition. In the range out of 41°-50°, there were other diffraction peaks, for example, at 2θ of 31°, 37°, 59° and 65° for spinel, Fe$_3$O$_4$, Co$_3$O$_4$ and the like, which were not further explained in the invention.

EXAMPLE 1.2

(1) 2.56 kg pseudo boehmite was added to 13.9 kg deionized water and dispersed to make a slurry. To the slurry, 232 mL hydrochloric acid was added to acidize for 15 min, to obtain an alumina gel. On a metal oxide basis, 140 g iron nitrate and 60 g cobalt nitrate were added to 3500 mL water, stirred until fully dissolved, and then the alumina gel was added thereto, stirred for another 20 min to obtain a slurry. The slurry was spray dried. 100 g of the particles obtained by the spray drying were weighted and transferred to a tubular furnace. A CO/N$_2$ mixture gas with a CO concentration of 10 volume % was introduced to the tubular furnace at a flow rate of 100 mL/min. The treatment was operated at 500° C. for 3 h, to obtain the composition S-1.2.

The test results of the content of each component in the composition S-1.2 were listed in Table 1.1. The composition S-1.2 had similar XRD test results to the example 1.1. In the XRD spectrum of the composition S-1.2 which was subjected to the treatment under a carbon-containing atmosphere, there were not only a diffraction peak at about 45.5° for Al$_2$O$_3$ and Co$_2$AlO$_4$, but also obvious diffraction peaks at about 42.6° and about 45.0°, which might be attributable to the fact that the composition S-1.2 subjected to the treatment under a carbon-containing atmosphere had a diffraction peak at 2θ of 44.9° for FeC (Fe$_3$C and Fe$_7$C$_3$) and elemental iron. In addition, as compared with the composition S-1.5, the composition S-1.2 had diffraction peaks at 2θ of 42.6° and 44.2° for cobalt monooxide and elemental cobalt.

EXAMPLE 1.3

(1) 2.34 kg pseudo boehmite was added to 12.7 kg deionized water and dispersed to make a slurry. To the slurry, 212 mL hydrochloric acid was added to acidize for 15 min, to give an alumina gel. On a metal oxide basis, 100 g iron nitrate and 200 g cobalt nitrate were added to 4000 mL water, stirred until fully dissolved, and then the alumina gel was added thereto, stirred for another 20 min to obtain a slurry. The slurry was spray dried. 100 g of the particles obtained by the spray drying were weighted and transferred to a tubular furnace. A CO/N$_2$ mixture gas with a CO concentration of 10 volume % was introduced to the tubular furnace at a flow rate of 100 mL/min. The treatment was operated at 650° C. for 1 h, to obtain the composition S-1.3.

The test results of the content of each component in the composition S-1.3 were listed in Table 1.1. The composition S-1.3 had similar XRD test results to the example 1.1. In the XRD spectrum of the composition S-1.3 which was subjected to the treatment under a carbon-containing atmosphere, there were not only a diffraction peak at about 45.5° for Al$_2$O$_3$ and Co$_2$AlO$_4$, but also obvious diffraction peaks at about 42.6° and about 45.0°, which might be attributable to the fact that the composition S-1.3 subjected to the treatment under a carbon-containing atmosphere had a diffraction peak at 2θ of 44.9° for FeC (Fe$_3$C and Fe$_7$C$_3$) and elemental iron. In addition, as compared with the composition S-1.5, the composition S-1.3 had diffraction peaks at 2θ of 42.6° and 44.2° for cobalt monooxide and elemental cobalt.

EXAMPLE 1.4

(1) 2.25 kg pseudo boehmite was added to 12.2 kg deionized water and dispersed to make a slurry. To the slurry, 204 mL hydrochloric acid was added to acidize for 15 min, to obtain an alumina gel. On a metal oxide basis, 200 g iron nitrate and 120 g cobalt nitrate were added to 3500 mL water, stirred until fully dissolved, and then the alumina gel was added thereto, stirred for another 20 min to give a slurry. The slurry was spray dried. 100 g of the particles obtained by the spray drying were weighted and transferred to a tubular furnace. A CO/N$_2$ mixture gas with a CO concentration of 10 volume % was introduced to the tubular furnace at a flow rate of 100 mL/min. The treatment was operated at 600° C. for 1.5 h, to give the composition S-1.4.

The test results of the content of each component in the composition S-1.4 were listed in Table 1.1. The composition S-1.4 had similar XRD test results to the example 1.1. In the XRD spectrum of the composition S-1.4 which was subjected to the treatment under a carbon-containing atmosphere, there were not only a diffraction peak at about 45.5° for Al$_2$O$_3$ and Co$_2$AlO$_4$, but also obvious diffraction peaks at about 42.6° and about 45.0°, which might be attributable to the fact that the composition S-1.4 subjected to the treatment under a carbon-containing atmosphere had a diffraction peak at 2θ of 44.9° for FeC (Fe$_3$C and Fe$_7$C$_3$) and elemental iron. In addition, as compared with the composition S-1.5, the composition S-1.4 had diffraction peaks at 2θ of 42.6° and 44.2° for cobalt monooxide and elemental cobalt.

EXAMPLE 1.5

The example 1.1 was repeated except that the CO/N$_2$ mixture gas with a CO concentration of 10 volume % was replaced with air, to obtain the composition 1.5.

The test results of the content of each component in the composition S-1.5 were listed in Table 1.1. The composition S-1.5 was analyzed by XRD. It could be seen from the XRD spectrum (as shown in FIG. 1) that there was not obvious diffraction peaks at 2θ of 42.6°, 44.2° and 44.9°, which shown that all of Fe and Co in the composition S-1.5 were presented in form of oxides.

EXAMPLE 1.6

The example 1.1 was repeated except that on a metal oxide basis, iron nitrate was used in an amount of 50 g and cobalt nitrate was used in an amount of 150 g, to obtain the composition 1.6.

The test results of the content of each component in the composition S-1.6 were listed in Table 1.1. The composition S-1.6 had similar XRD test results to the example 1.1. In the XRD spectrum of the composition S-1.6 which was subjected to the treatment under a carbon-containing atmosphere, there were not only a diffraction peak at about 45.5° for Al$_2$O$_3$ and Co$_2$AlO$_4$, but also obvious diffraction peaks at about 42.6° and about 45.0°, which might be attributable to the fact that the composition S-1.6 subjected to the treatment under a carbon-containing atmosphere had a diffraction peak at 2θ of 44.9° for FeC ($Fe_3C$ and $Fe_7C_3$) and elemental iron. In addition, as compared with the composition S-1.5, the composition S-1.6 had diffraction peaks at 2θ of 42.6° and 44.2° for cobalt monooxide and elemental cobalt.

EXAMPLE 1.7

The example 1.1 was repeated except that on a metal oxide basis, iron nitrate was used in an amount of 150 g and cobalt nitrate was used in an amount of 50 g, to obtain the composition 1.7.

The test results of the content of each component in the composition S-1.7 were listed in Table 1.1. The composition S-1.7 had similar XRD test results to the example 1.1. In the XRD spectrum of the composition S-1.7 which was subjected to the treatment under a carbon-containing atmosphere, there were not only a diffraction peak at about 45.5° for $Al_2O_3$ and $Co_2AlO_4$, but also obvious diffraction peaks at about 42.6° and about 45.0°, which might be attributable to the fact that the composition S-1.7 subjected to the treatment under a carbon-containing atmosphere had a diffraction peak at 2θ of 44.9° for FeC ($Fe_3C$ and $Fe_7C_3$) and elemental iron. In addition, as compared with the composition S-1.5, the composition S-1.7 had diffraction peaks at 2θ of 42.6° and 44.2° for cobalt monooxide and elemental cobalt.

EXAMPLE 1.8

The example 1.1 was repeated except that the $CO/N_2$ mixture gas with a CO concentration of 10 volume % was replaced with an ethane/nitrogen mixture gas with an ethane concentration of 10 volume %, to obtain the composition 1.8.

The test results of the content of each component in the composition S-1.8 were listed in Table 1.1. The composition S-1.8 had similar XRD test results to the example 1.1. In the XRD spectrum of the composition S-1.8 which was subjected to the treatment under a carbon-containing atmosphere, there were not only a diffraction peak at about 45.5° for $Al_2O_3$ and $Co_2AlO_4$, but also obvious diffraction peaks at about 42.6° and about 45.0°, which might be attributable to the fact that the composition S-1.8 subjected to the treatment under a carbon-containing atmosphere had a diffraction peak at 2θ of 44.9° for FeC ($Fe_3C$ and $Fe_7C_3$) and elemental iron. In addition, as compared with the composition S-1.5, the composition S-1.8 had diffraction peaks at 2θ of 42.6° and 44.2° for cobalt monooxide and elemental cobalt.

COMPARATIVE EXAMPLE 1.1

The example 1.1 was repeated except that on a metal oxide basis, cobalt nitrate was replaced with iron nitrate in the same amount, to obtain the composition D-1.1.

The test results of the content of each component in the composition D-1.1 were listed in Table 1.1.

COMPARATIVE EXAMPLE 1.2

The example 1.1 was repeated except that on a metal oxide basis, iron nitrate was replaced with cobalt nitrate in the same amount, to obtain the composition D-1.2.

The test results of the content of each component in the composition D-1.2 were listed in Table 1.1.

COMPARATIVE EXAMPLE 3

A comparative composition was prepared according to the method described in U.S. Pat. No. 6,800,586. 34.4 g dried microsphere carriers of γ-alumina were weighted, impregnated with a solution made from 10.09 g cerium nitrate, 2.13 g lanthanum nitrate and 18 mL water, dried at 120° C. and calcined at 600° C. for 1 hour, impregnated again with a solution made of 2.7 g copper nitrate and 18 mL water, and dried at 120° C. and calcined at 600° C. for 1 hour, to obtain the composition D-3. On an oxide basis, the composition D-3 comprised $RE_2O_3$ in an amount of 12% by weight and CuO in an amount of 2.3% by weight (wherein RE represented lanthanide metal element), based on the total weight of the composition D-3.

TABLE 1.1

|  | Composition No. | Fe | Co |
|---|---|---|---|
| Example 1.1 | S-1.1 | 5 | 5 |
| Comparative example 1.1 | D-1.1 | 10 | — |
| Comparative example 1.2 | D-1.2 | — | 10 |
| Example 1.2 | S-1.2 | 7 | 3 |
| Example 1.3 | S-1.3 | 5 | 10 |
| Example 1.4 | S-1.4 | 10 | 6 |
| Example 1.5 | S-1.5 | 5 | 5 |
| Example 1.6 | S-1.6 | 2.5 | 7.5 |
| Example 1.7 | S-1.7 | 7.5 | 2.5 |
| Example 1.8 | S-1.8 | 5 | 5 |

The content of each component was presented as percentage by weight on an oxide basis.

EXAMPLE 2.1

(1) 2.62 kg pseudo boehmite was added to 14.2 kg deionized water and dispersed to make a slurry. To the slurry, 238 mL hydrochloric acid was added to acidize for 15 min, to obtain an alumina gel. On a metal oxide basis, 100 g iron nitrate (calculated in $Fe_2O_3$, the same below) and 100 g cobalt nitrate (calculated in $Co_2O_3$, the same below) were added to 3500 mL water, stirred until fully dissolved, and then the alumina gel was added thereto, stirred for another 15 min to obtain a first solution. 100 g MgO were added to 360 g water, stirred for 10 min, and then added to the first solution, stirred for another 20 min to obtain a slurry. The slurry was spray dried. 100 g of the particles obtained by spray drying (with an average particle size being 65 μm and the particles having a particle size of 40-80 μm being in an amount of 60%, the same below) were weighted and transferred to a tubular furnace. A $CO/N_2$ mixture gas with a CO concentration of 10 volume % was introduced to the tubular furnace at a flow rate of 100 mL/min. The treatment was operated at 600° C. for 1.5 h, to obtain the composition S-2.1.

The test results of the content of each component in the composition S-2.1 were listed in Table 2.1.

The composition S-2.1 was analyzed by XRD, and the XRD spectrum was shown in FIG. 2. As shown in FIG. 2, there was a diffraction peak at about 43.0° for MgO and a diffraction peak at about 45.0° for $Al_2O_3$, $Co_2AlO_4$ and $MgAl_2O_4$ in the XRD spectrum of the composition S-2.5 which was not subjected to the treatment under a carbon-containing atmosphere. In the XRD spectrum of the composition S-2.1 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shifted to the left, and the diffraction peak at about 45.0° became substantially stronger, which might be attributable to the fact that the composition S-2.1 subjected to the treatment under a carbon-containing atmosphere had a diffraction peak at 2θ of 44.9° for FeC ($Fe_3C$ and $Fe_7C_3$) and elemental iron. In addition, as compared with the composition S-2.5, the composition S-2.1 had diffraction peaks at 2θ of 42.6° and 44.2° for cobalt monooxide and elemental cobalt.

EXAMPLE 2.2

(1) 2.56 kg pseudo boehmite was added to 13.9 kg deionized water and dispersed to make a slurry. To the slurry, 232 mL hydrochloric acid was added to acidize for 15 min, to obtain an alumina gel. On a metal oxide basis, 140 g iron nitrate and 60 g cobalt nitrate were added to 3500 mL water, stirred until fully dissolved, and then the alumina gel was added thereto, stirred for another 15 min to obtain a first solution. 160 g MgO were added to 480 g water, stirred for 10 min, and then added to the first solution, stirred for another 20 min to obtain a slurry. The slurry was spray dried. 100 g of the particles obtained by spray drying were weighted and transferred to a tubular furnace. A $CO/N_2$ mixture gas with a CO concentration of 10 volume % was introduced to the tubular furnace at a flow rate of 100 mL/min. The composition S-2.2 was obtained.

The test results of the content of each component in the composition S-2.2 were listed in Table 2.1. The composition S-2.2 had similar XRD test results to the example 2.1. In the XRD spectrum of the composition S-2.2 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shifted to the left, and the diffraction peak at about 45.0° became substantially stronger, which might be attributable to the fact that the composition S-2.2 subjected to the treatment under a carbon-containing atmosphere had a diffraction peak at 2θ of 44.9° for FeC ($Fe_3C$ and $Fe_7C_3$) and elemental iron. In addition, as compared with the composition S-2.5, the composition S-2.2 had diffraction peaks at 2θ of 42.6° and 44.2° for cobalt monooxide and elemental cobalt.

EXAMPLE 2.3

(1) 2.34 kg pseudo boehmite was added to 12.7 kg deionized water and dispersed to make a slurry. To the slurry, 212 mL hydrochloric acid was added to acidize for 15 min, to obtain an alumina gel. On a metal oxide basis, 100 g iron nitrate and 200 g cobalt nitrate were added to 4000 mL water, stirred until fully dissolved, and then the alumina gel was added thereto, stirred for another 15 min to obtain a first solution. 200 g MgO were added to 600 g water, stirred for 10 min, and then added to the first solution, stirred for another 20 min to obtain a slurry. The slurry was spray dried. 100 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 650° C. for 1 h, to obtain the composition S-2.3.

The test results of the content of each component in the composition S-2.3 were listed in Table 2.1. The composition S-2.3 had similar XRD test results to the example 2.1. In the XRD spectrum of the composition S-2.3 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shifted to the left, and the diffraction peak at about 45.0° became substantially stronger, which might be attributable to the fact that the composition S-2.3 subjected to the treatment under a carbon-containing atmosphere had a diffraction peak at 2θ of 44.9° for FeC ($Fe_3C$ and $Fe_7C_3$) and elemental iron. In addition, as compared with the composition S-2.5, the composition S-2.3 had diffraction peaks at 2θ of 42.6° and 44.2° for cobalt monooxide and elemental cobalt.

EXAMPLE 2.4

(1) 2.25 kg pseudo boehmite was added to 12.2 kg deionized water and dispersed to make a slurry. To the slurry, 204 mL hydrochloric acid was added to acidize for 15 min, to obtain an alumina gel. On a metal oxide basis, 200 g iron nitrate and 120 g cobalt nitrate were added to 3500 mL water, stirred until fully dissolved, and then the alumina gel was added thereto, stirred for another 15 min to obtain a first solution. 240 g MgO were added to 720 g water, stirred for 10 min, and then added to the first solution, stirred for another 20 min to obtain a slurry. The slurry was spray dried. 100 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 600° C. for 1.5 h, to obtain the composition S-2.4.

The test results of the content of each component in the composition S-2.4 were listed in Table 2.1. The composition S-2.3 had similar XRD test results to the example 2.1. In the XRD spectrum of the composition S-2.4 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shifted to the left, and the diffraction peak at about 45.0° became substantially stronger, which might be attributable to the fact that the composition S-2.4 subjected to the treatment under a carbon-containing atmosphere had a diffraction peak at 2θ of 44.9° for FeC ($Fe_3C$ and $Fe_7C_3$) and elemental iron. In addition, as compared with the composition S-2.5, the composition S-2.4 had diffraction peaks at 2θ of 42.6° and 44.2° for cobalt monooxide and elemental cobalt.

EXAMPLE 2.5

The example 2.1 was repeated except that the $CO/N_2$ mixture gas with a CO concentration of 10 volume % was replaced with air, to obtain the composition 2.5.

The test results of the content of each component in the composition S-2.5 were listed in Table 2.1. The composition S-2.5 was analyzed by XRD. It could be seen from the XRD spectrum (as shown in FIG. 2) that there was not obvious diffraction peaks at 2θ of 42.6°, 44.2° and 44.9°, which shown that all of Fe and Co in the composition S-2.5 were presented in form of oxides.

EXAMPLE 2.6

The example 2.1 was repeated except that MgO was replaced with CaO in the same amount on a metal oxide basis, to obtain the composition S-2.6.

The test results of the content of each component in the composition S-2.6 were listed in Table 2.1. The composition S-2.6 had similar XRD test results to the example 2.1. In the XRD spectrum of the composition S-2.6 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shifted to the left, and the diffraction peak at about 45.0° became substantially stronger, which might be attributable to the fact that the composition S-2.6 subjected to the treatment under a carbon-containing atmosphere had a diffraction peak at 2θ of 44.9° for FeC ($Fe_3C$ and $Fe_7C_3$) and elemental iron. In addition, as compared with the composition S-2.5, the composition S-2.6 had diffraction peaks at 2θ of 42.6° and 44.2° for cobalt monooxide and elemental cobalt.

EXAMPLE 2.7

The example 2.1 was repeated except that on a metal oxide basis, iron nitrate was used in an amount of 50 g and cobalt nitrate was used in an amount of 150 g, to obtain the composition S-2.7.

The test results of the content of each component in the composition S-2.7 were listed in Table 2.1. The composition S-2.7 had similar XRD test results to the example 2.1. In the XRD spectrum of the composition S-2.7 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shifted to the left, and the diffraction peak at about 45.0° became substantially stronger, which might be attributable to the fact that the composition S-2.7 subjected to the treatment under a carbon-containing atmosphere had a diffraction peak at 2θ of 44.9° for FeC ($Fe_3C$ and $Fe_7C_3$) and elemental iron. In addition, as compared with the composition S-2.5, the composition S-2.7 had diffraction peaks at 2θ of 42.6° and 44.2° for cobalt monooxide and elemental cobalt.

EXAMPLE 2.8

The example 2.1 was repeated except that on a metal oxide basis, iron nitrate was used in an amount of 150 g and cobalt nitrate was used in an amount of 50 g, to obtain the composition S-2.8.

The test results of the content of each component in the composition S-2.8 were listed in Table 2.1. The composition S-2.8 had similar XRD test results to the example 2.1. In the XRD spectrum of the composition S-2.8 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shifted to the left, and the diffraction peak at about 45.0° became substantially stronger, which might be attributable to the fact that the composition S-2.8 subjected to the treatment under a carbon-containing atmosphere had a diffraction peak at 2θ of 44.9° for FeC ($Fe_3C$ and $Fe_7C_3$) and elemental iron. In addition, as compared with the composition S-2.5, the composition S-2.8 had diffraction peaks at 2θ of 42.6° and 44.2° for cobalt monooxide and elemental cobalt.

EXAMPLE 2.9

The example 2.1 was repeated except that the $CO/N_2$ mixture gas with a CO concentration of 10 volume % was replaced with an ethane/nitrogen mixture gas with an ethane concentration of 10 volume %, to obtain the composition 2.9.

The test results of the content of each component in the composition S-2.9 were listed in Table 2.1. The composition S-2.9 had similar XRD test results to the example 2.1. In the XRD spectrum of the composition S-2.8 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° shifted to the left, and the diffraction peak at about 45.0° became substantially stronger, which might be attributable to the fact that the composition S-2.9 subjected to the treatment under a carbon-containing atmosphere had a diffraction peak at 2θ of 44.9° for FeC ($Fe_3C$ and $Fe_7C_3$) and elemental iron. In addition, as compared with the composition S-2.5, the composition S-2.9 had diffraction peaks at 2θ of 42.6° and 44.2° for cobalt monooxide and elemental cobalt.

COMPARATIVE EXAMPLE 2.1

The example 2.1 was repeated except that on a metal oxide basis, cobalt nitrate was replaced with iron nitrate in the same amount, to obtain the composition D-2.1.

The test results of the content of each component in the composition D-2.1 were listed in Table 2.1.

COMPARATIVE EXAMPLE 2.2

The example 2.1 was repeated except that on a metal oxide basis, iron nitrate was replaced with cobalt nitrate in the same amount, to obtain the composition D-2.2.

The test results of the content of each component in the composition D-2.2 were listed in Table 2.1.

TABLE 2.1

| | Composition No. | The first metal element | | The second metal element |
|---|---|---|---|---|
| | | Fe | Co | |
| Example 2.1 | S-2.1 | 5 | 5 | 5 |
| Comparative example 2.1 | D-2.1 | 10 | — | 5 |
| Comparative example 2.2 | D-2.2 | — | 10 | 5 |
| Example 2.2 | S-2.2 | 7 | 3 | 8 |
| Example 2.3 | S-2.3 | 5 | 10 | 10 |
| Example 2.4 | S-2.4 | 10 | 6 | 12 |
| Example 2.5 | S-2.5 | 5 | 5 | 5 |
| Example 2.6 | S-2.6 | 5 | 5 | 5 |
| Example 2.7 | S-2.7 | 2.5 | 7.5 | 5 |
| Example 2.8 | S-2.8 | 7.5 | 2.5 | 5 |
| Example 2.9 | S-2.9 | 5 | 5 | 5 |

The content of each component was presented as percentage by weight on an oxide basis.

EXAMPLE 3.1

2.62 kg pseudo boehmite was added to 14.2 kg deionized water and dispersed to make a slurry. To the slurry, 238 mL hydrochloric acid was added to acidize for 15 min, to obtain an alumina gel. On a metal oxide basis, 60 g iron nitrate (calculated in $Fe_2O_3$, the same below), 60 g cobalt nitrate (calculated in $Co_2O_3$, the same below) and 100 g $KMnO_4$ (calculated in MnO, the same below) were added to 3500 mL water, stirred until fully dissolved, and then the alumina gel was added thereto, stirred for another 15 min to obtain a first solution. 100 g MgO were added to 300 g water, stirred for 10 min, and then added to the first solution, stirred for another 20 min to obtain a slurry. The slurry was spray dried. 100 g of the particles obtained by spray drying (with an average particle size being 65 μm and the particles having a particle size of 40-80 μm being in an amount of 60%, the same below) were weighted and transferred to a tubular furnace. A $CO/N_2$ mixture gas with a CO concentration of 10 volume % was introduced to the tubular furnace at a flow rate of 100 mL/min. The treatment was operated at 600° C. for 1.5 h, to obtain the composition S-3.1.

The test results of the content of each component in the composition S-3.1 were listed in Table 3.1.

The composition S-3.1 was analyzed by XRD, and the XRD spectrum was shown in FIG. 3. As shown in FIG. 3, there were a diffraction peak at about 43.0° for MgO and a diffraction peak at about 45.0° for $Al_2O_3$, $Co_2AlO_4$ and $MgAl_2O_4$ in the XRD spectrum of the composition S-3.5 which was not subjected to the treatment under a carbon-containing atmosphere. In the XRD spectrum of the composition S-3.1 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.1 subjected to the treatment under a carbon-containing atmosphere had a diffraction peak at 2θ of 44.9° for FeC ($Fe_3C$ and $Fe_7C_3$) and elemental iron. In addition, as compared with the composition S-3.5, the composition S-3.1 had diffraction peaks at 2θ of 42.6° and 44.2° for cobalt monooxide and elemental cobalt.

EXAMPLE 3.2

(1) 2.53 kg pseudo boehmite was added to 13.7 kg deionized water and dispersed to make a slurry. To the slurry, 229 mL hydrochloric acid was added to acidize for 15 min, to obtain an alumina gel. On a metal oxide basis, 100 g iron nitrate, 60 g cobalt nitrate and 100 g $KMnO_4$ (calculated in MnO) were added to 3500 mL water, stirred until fully dissolved, and then the alumina gel was added thereto stirred for another 15 min to obtain a first solution. 160 g MgO were added to 480 g water, stirred for 10 min, and then added to the first solution, stirred for another 20 min to obtain a slurry. The slurry was spray dried. 100 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 500° C. for 3 h, to obtain the composition S-3.2.

The test results of the content of each component in the composition S-3.2 were listed in Table 3.1. The composition S-3.2 had similar XRD test results to the example 3.1. In the XRD spectrum of the composition S-3.2 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.2 subjected to the treatment under a carbon-containing atmosphere had a diffraction peak at 2θ of 44.9° for FeC ($Fe_3C$ and $Fe_7C_3$) and elemental iron. In addition, as compared with the composition S-3.5, the composition S-3.2 had diffraction peaks at 2θ of 42.6° and 44.2° for cobalt monooxide and elemental cobalt.

EXAMPLE 3.3

(1) 2.09 kg pseudo boehmite was added to 11.3 kg deionized water and dispersed to make a slurry. To the slurry, 190 mL hydrochloric acid was added to acidize for 15 min, to give an alumina gel. On a metal oxide basis, 100 g iron nitrate, 200 g cobalt nitrate and 160 g $KMnO_4$ (calculated in MnO) were added to 4000 mL water, stirred until fully dissolved, and then the alumina gel was added thereto, stirred for another 15 min to obtain a first solution. 200 g MgO were added to 600 g water, stirred for 10 min, and then added to the first solution, stirred for another 20 min to obtain a slurry. The slurry was spray dried. 100 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 650° C. for 1 h, to obtain the composition S-3.3.

The test results of the content of each component in the composition S-3.3 were listed in Table 3.1. The composition S-3.3 had similar XRD test results to the example 3.1. In the XRD spectrum of the composition S-3.3 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.3 subjected to the treatment under a carbon-containing atmosphere had a diffraction peak at 2θ of 44.9° for FeC ($Fe_3C$ and $Fe_7C_3$) and elemental iron. In addition, as compared with the composition S-3.5, the composition S-3.3 had diffraction peaks at 2θ of 42.6° and 44.2° for cobalt monooxide and elemental cobalt.

EXAMPLE 3.4

(1) 2.09 kg pseudo boehmite was added to 11.3 kg deionized water and dispersed to make a slurry. To the slurry, 190 mL hydrochloric acid was added to acidize for 15 min, to obtain an alumina gel. On a metal oxide basis, 200 g iron nitrate, 120 g cobalt nitrate and 100 g $KMnO_4$ (calculated in MnO) were added to 3500 mL water, stirred until fully dissolved, and then the alumina gel was added thereto, stirred for another 15 min to obtain a first solution. 240 g MgO were added to 720 g water, stirred for 10 min, and then added to the first solution, stirred for another 20 min to obtain a slurry. The slurry was spray dried. 100 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 600° C. for 1.5 h, to obtain the composition S-3.4.

The test results of the content of each component in the composition S-3.4 were listed in Table 3.1. The composition S-3.4 had similar XRD test results to the example 3.1. In the XRD spectrum of the composition S-3.4 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.4 subjected to the treatment under a carbon-containing atmosphere had a diffraction peak at 2θ of 44.9°, wherein the diffraction peak at 2θ of 44.9° was for FeC ($Fe_3C$ and $Fe_7C_3$) and elemental iron. In addition, as compared with the composition S-3.5, the composition S-3.4 had diffraction peaks at 42.6° and 44.2°, wherein the diffraction peaks at 2θ of 42.6° and 44.2° were for cobalt monooxide and elemental cobalt.

EXAMPLE 3.5

The example 3.1 was repeated except that the $CO/N_2$ mixture gas with a CO concentration of 10 volume % was replaced with air, to obtain the composition 3.5.

The test results of the content of each component in the composition S-3.5 were listed in Table 3.1. The composition S-3.5 was analyzed by XRD. It could be seen from the XRD spectrum (as shown in FIG. 3) that there was not obvious diffraction peaks at 2θ of 42.6°, 44.2° and 44.9°, which shown that all of Fe and Co in the composition S-3.5 were presented in form of oxides.

EXAMPLE 3.6

The example 3.1 was repeated except that on a metal oxide basis, MgO was replaced with CaO in the same amount, to obtain the composition S-3.6.

The test results of the content of each component in the composition S-3.6 were listed in Table 3.1. The composition S-3.6 had similar XRD test results to the example 3.1. In the XRD spectrum of the composition S-3.6 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.6 subjected to the treatment under a carbon-containing atmosphere had a diffraction peak at 2θ of 44.9° for FeC ($Fe_3C$ and $Fe_7C_3$) and elemental iron. In addition, as compared with the composition S-3.5, the composition S-3.6 had diffraction peaks at 2θ of 42.6° and 44.2° for cobalt monooxide and elemental cobalt.

EXAMPLE 3.7

The example 3.1 was repeated except that on a metal oxide basis, $KMnO_4$ was replaced with $CeCl_2$ in the same amount, to obtain the composition S-3.7.

The test results of the content of each component in the composition S-3.7 were listed in Table 3.1. The composition S-3.7 had similar XRD test results to the example 3.1. In the XRD spectrum of the composition S-3.7 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.7 subjected to the treatment under a carbon-containing atmosphere had a diffraction peak at 2θ of 44.9° for FeC ($Fe_3C$ and $Fe_7C_3$) and elemental iron. In addition, as compared with the composition S-3.5, the composition S-3.7 had diffraction peaks at 2θ of 42.6° and 44.2° for cobalt monooxide and elemental cobalt.

EXAMPLE 3.8

The example 3.1 was repeated except that on a metal oxide basis, iron nitrate was used in an amount of 30 g and cobalt nitrate was used in an amount of 90 g, to obtain the composition S-3.8.

The test results of the content of each component in the composition S-3.8 were listed in Table 3.1. The composition S-3.8 had similar XRD test results to the example 3.1. In the XRD spectrum of the composition S-3.8 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.8 subjected to the treatment under a carbon-containing atmosphere had a diffraction peak at 2θ of 44.9° was for FeC ($Fe_3C$ and $Fe_7C_3$) and elemental iron. In addition, as compared with the composition S-3.5, the composition S-3.8 had diffraction peaks at 2θ of 42.6° and 44.2° were for cobalt monooxide and elemental cobalt.

EXAMPLE 3.9

The example 3.1 was repeated except that on a metal oxide basis, iron nitrate was used in an amount of 90 g and cobalt nitrate was used in an amount of 30 g, to obtain the composition S-3.9.

The test results of the content of each component in the composition S-3.9 were listed in Table 3.1. The composition S-3.9 had similar XRD test results to the example 3.1. In the XRD spectrum of the composition S-3.9 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.9 subjected to the treatment under a carbon-containing atmosphere had a diffraction peak at 2θ of 44.9° for FeC ($Fe_3C$ and $Fe_7C_3$) and elemental iron. In addition, as compared with the composition S-3.5, the composition S-3.9 had diffraction peaks at 2θ of 42.6° and 44.2° for cobalt monooxide and elemental cobalt.

EXAMPLE 3.10

The example 3.1 was repeated except that the $CO/N_2$ mixture gas with a CO concentration of 10 volume % was replaced with an ethane/nitrogen mixture gas with an ethane concentration of 10 volume %, to obtain the composition 3.10.

The test results of the content of each component in the composition S-3.10 were listed in Table 3.1. The composition S-3.10 had similar XRD test results to the example 3.1. In the XRD spectrum of the composition S-3.10 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-3.10 subjected to the treatment under a carbon-containing atmosphere had a diffraction peak at 2θ of 44.9° for FeC ($Fe_3C$ and $Fe_7C_3$) and elemental iron. In addition, as compared with the composition S-3.5, the composition S-3.10 had diffraction peaks at 2θ of 42.6° and 44.2° for cobalt monooxide and elemental cobalt.

COMPARATIVE EXAMPLE 3.1

The example 3.1 was repeated except that on a metal oxide basis, cobalt nitrate was replaced with iron nitrate in the same amount, to obtain the composition D-3.1.

The test results of the content of each component in the composition D-3.1 were listed in Table 3.1.

COMPARATIVE EXAMPLE 3.2

The example 3.1 was repeated except that on a metal oxide basis, iron nitrate was replaced with cobalt nitrate in the same amount, to obtain the composition D-3.2.

The test results of the content of each component in the composition D-3.2 were listed in Table 3.1.

TABLE 3.1

| Composition No. | The first metal element Fe | The first metal element Co | The second metal element | The third metal element |
|---|---|---|---|---|
| Example 3.1 | S-3.1 | 3 | 3 | 5 | 5 |
| Comparative example 3.1 | D-3.1 | 6 | — | 5 | 5 |
| Comparative example 3.2 | D-3.2 | — | 6 | 5 | 5 |
| Example 3.2 | S-3.2 | 5 | 3 | 8 | 3 |
| Example 3.3 | S-3.3 | 5 | 10 | 10 | 8 |
| Example 3.4 | S-3.4 | 10 | 6 | 12 | 5 |
| Example 3.5 | S-3.5 | 3 | 3 | 5 | 5 |
| Example 3.6 | S-3.6 | 3 | 3 | 5 | 5 |
| Example 3.7 | S-3.7 | 3 | 3 | 5 | 5 |
| Example 3.8 | S-3.8 | 1.5 | 4.5 | 5 | 5 |
| Example 3.9 | S-3.9 | 4.5 | 1.5 | 5 | 5 |
| Example 3.10 | S-3.10 | 3 | 3 | 5 | 5 |

The content of each component was presented as percentage by weight on an oxide basis.

EXAMPLE 4.1

(1) 2.62 kg pseudo boehmite was added to 14.2 kg deionized water and dispersed to make a slurry. To the slurry, 238 mL hydrochloric acid was added to acidize for 15 min, to obtain an alumina gel. On a metal oxide basis, 100 g iron nitrate (calculated in $Fe_2O_3$, the same below) and 100 g cobalt nitrate (calculated in $Co_2O_3$, the same below) were added to 3500 mL water, stirred until fully dissolved, and then the alumina gel was added thereto, stirred for another 15 min to obtain a first solution. 100 g MgO were added to 360 g water, stirred for 10 min, and then added to the first solution, stirred for another 20 min to obtain a slurry. The slurry was spray dried. 150 g of the particles obtained by spray drying (with an average particle size being 65 μm and the particles having a particle size of 40-80 μm being in an amount of 60%, the same below) were weighted and transferred to a tubular furnace. A CO/$N_2$ mixture gas with a CO concentration of 10 volume % was introduced to the tubular furnace at a flow rate of 100 mL/min. The treatment was operated at 600° C. for 1.5 h, to obtain a semi-finished composition.

(2) 100 g of the semi-finished composition was weighted and added into 700 ml water, then 4.8 mL of a $RuCl_3$ solution with the mass content of 12.5 g/L on the metal element basis was added thereto, stirred for 20 min and filtered to obtain a solid product. The solid product was rinsed with 80 mL aqueous ammonia with a concentration of 2 mol/L, and dried at 100° C. for 4 h and then calcined at 400° C. for 2 h, to get the composition S-4.1.

The test results of the content of each component in the composition S-4.1 were listed in Table 4.1.

The composition S-4.1 was analyzed by XRD, and the XRD spectrum was shown in FIG. 4. As shown in FIG. 4, there were a diffraction peak at about 43.0° for MgO and a diffraction peak at about 45.0° for $Al_2O_3$, $Co_2AlO_4$ and $MgAl_2O_4$ in the XRD spectrum of the composition S-4.5 which was not subjected to the treatment under a carbon-containing atmosphere. In the XRD spectrum of the composition S-4.1 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-4.1 subjected to the treatment under a carbon-containing atmosphere had a diffraction peak at 2θ of 44.9° for FeC ($Fe_3C$ and $Fe_7C_3$) and elemental iron. In addition, as compared with the composition S-4.5, the composition S-4.1 had diffraction peaks at 2θ of 42.6° and 44.2° for cobalt monooxide and elemental cobalt.

EXAMPLE 4.2

(1) 2.56 kg pseudo boehmite was added to 13.9 kg deionized water and dispersed to make a slurry. To the slurry, 232 mL hydrochloric acid was added to acidize for 15 min, to obtain an alumina gel. On a metal oxide basis, 140 g iron nitrate and 60 g cobalt nitrate were added to 3500 mL water, stirred until fully dissolved, and then the alumina gel was added thereto, stirred for another 15 min to obtain a first solution. 160 g MgO were added to 480 g water, stirred for 10 min, and then added to the first solution, stirred for another 20 min to obtain a slurry. The slurry was spray dried. 150 g of the particles obtained by spray drying were weighted and transferred to a tubular furnace. A CO/$N_2$ mixture gas with a CO concentration of 10 volume % was introduced to the tubular furnace at a flow rate of 100 mL/min. The treatment was operated at 500° C. for 3 h, to obtain a semi-finished composition.

(2) 100 g of the semi-finished composition was weighted and added into 700 ml water, then 4.4 mL of a $RuCl_3$ solution with the mass content of 12.5 g/L on the metal element basis was added thereto, stirred for 20 min and filtered to obtain a solid product. The solid product was rinsed with 100 mL aqueous ammonia with a concentration of 2 mol/L, and dried at 100° C. for 4 h and then calcined at 400° C. for 2 h, to get the composition S-4.2.

The test results of the content of each component in the composition S-4.2 were listed in Table 4.1. The composition S-4.2 had similar XRD test results to the example 4.1. In the XRD spectrum of the composition S-4.2 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and about 45.0° became substantially stronger and shifted to the left, which might be attributable to the fact that the composition S-4.2 subjected to the treatment under a carbon-containing atmosphere had a diffraction peak at 2θ of 44.9° for FeC ($Fe_3C$ and $Fe_7C_3$) and elemental iron. In addition, as compared with the composition S-4.5, the composition S-4.2 had diffraction peaks at 2θ of 42.6° and 44.2° for cobalt monooxide and elemental cobalt.

EXAMPLE 4.3

(1) 2.34 kg pseudo boehmite was added to 12.7 kg deionized water and dispersed to make a slurry. To the slurry, 212 mL hydrochloric acid was added to acidize for 15 min, to obtain an alumina gel. On a metal oxide basis, 100 g iron nitrate and 200 g cobalt nitrate were added to 4000 mL water, stirred until fully dissolved, and then the alumina gel was added thereto, stirred for another 15 min to obtain a first solution. 200 g MgO were added to 600 g water, stirred for 10 min, and then added to the first solution, stirred for another 20 min to obtain a slurry. The slurry was spray dried. 150 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 650° C. for 1 h, to obtain a semi-finished composition.

(2) 100 g of the semi-finished composition was weighted and added into 700 ml water, then 4 mL of a $RuCl_3$ solution with the mass content of 12.5 g/L on the metal element basis, was added thereto, stirred for 20 min and filtered to obtain a solid product. The solid product was rinsed with 80 mL aqueous ammonia with a concentration of 2 mol/L, and dried at 100° C. for 4 h and then calcined at 400° C. for 2 h, to get the composition S-4.3.

The test results of the content of each component in the composition S-4.3 were listed in Table 4.1. The composition S-4.3 had similar XRD test results to the example 4.1. In the XRD spectrum of the composition S-4.3 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-4.3 subjected to the treatment under a carbon-containing atmosphere had a diffraction peak at 2θ of 44.9° for FeC ($Fe_3C$ and $Fe_7C_3$) and elemental iron. In addition, as compared with the composition S-4.5, the composition S-4.3 had diffraction peaks at 2θ of 42.6° and 44.2° for cobalt monooxide and elemental cobalt.

EXAMPLE 4.4

(1) 2.25 kg pseudo boehmite was added to 12.2 kg deionized water and dispersed to make a slurry. To the slurry, 204 mL hydrochloric acid was added to acidize for 15 min, to obtain an alumina gel. On a metal oxide basis, 200 g iron nitrate and 120 g cobalt nitrate were added to 3500 mL water, stirred until fully dissolved, and then the alumina gel was added thereto, stirred for another 15 min to obtain a first solution. 240 g MgO were added to 720 g water, stirred for 10 min, and then added to the first solution, stirred for another 20 min to obtain a slurry. The slurry was spray dried. 150 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 600° C. for 1.5 h, to obtain a semi-finished composition.

(2) 100 g of the semi-finished composition was weighted and added into 700 ml water, then 5.2 mL of a $RuCl_3$ solution with the mass content of 12.5 g/L on the metal element basis was added thereto, stirred for 20 min and filtered to obtain a solid product. The solid product was rinsed with 80 mL aqueous ammonia with a concentration of 2 mol/L, and dried at 100° C. for 4 h and then calcined at 400° C. for 2 h, to get the composition S-4.4.

The test results of the content of each component in the composition S-4.4 were listed in Table 4.1. The composition S-4.4 had similar XRD test results to the example 4.1. In the XRD spectrum of the composition S-4.4 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-4.4 subjected to the treatment under a carbon-containing atmosphere had a diffraction peak at 2θ of 44.9° for FeC ($Fe_3C$ and $Fe_7C_3$) and elemental iron. In addition, as compared with the composition S-4.5, the composition S-4.4 had diffraction peaks at 2θ of 42.6° and 44.2° for cobalt monooxide and elemental cobalt.

EXAMPLE 4.5

The example 4.1 was repeated except that the $CO/N_2$ mixture gas with a CO concentration of 10 volume % was replaced with air, to obtain the composition 4.5.

The test results of the content of each component in the composition S-4.5 were listed in Table 4.1. The composition S-4.5 was analyzed by XRD. It could be seen from the XRD spectrum (as shown in FIG. 4) that there was not obvious diffraction peaks at 2θ of 42.6°, 44.2° and 44.9°, which shown that all of Fe and Co in the composition S-4.5 were presented in form of oxides.

EXAMPLE 4.6

The example 4.1 was repeated except that the step (2) did not involve the rinsing of the solid product with 80 mL aqueous ammonia with a concentration of 2 mol/L. Instead, the solid product was directly dried and then calcined, to get the composition S-4.6.

The test results of the content of each component in the composition S-4.6 were listed in Table 4.1. The composition S-4.6 had similar XRD test results to the example 4.1. In the XRD spectrum of the composition S-4.6 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-4.6 subjected to the treatment under a carbon-containing atmosphere had a diffraction peak at 2θ of 44.9° for FeC (Fe$_3$C and Fe$_7$C$_3$) and elemental iron. In addition, as compared with the composition S-4.5, the composition S-4.6 had diffraction peaks at 2θ of 42.6° and 44.2° for cobalt monooxide and elemental cobalt.

EXAMPLE 4.7

The example 4.1 was repeated except that on a metal oxide basis, MgO was replaced with CaO in the same amount, to obtain the composition S-4.6.

The test results of the content of each component in the composition S-4.7 were listed in Table 4.1. The composition S-4.7 had similar XRD test results to the example 4.1. In the XRD spectrum of the composition S-4.7 which was subjected to the treatment under a carbon-containing atmosphere, not only there were a diffraction peak at about 43.0° for MgO and a diffraction peak at about 45.0° for Al$_2$O$_3$, Co$_2$AlO$_4$ and MgAl$_2$O$_4$, but also the diffraction peaks at about 43.0° and at about 45.0° became substantially stronger and shifted to the left, which might be attributable to the fact that the composition S-4.7 subjected to the treatment under a carbon-containing atmosphere had a diffraction peak at 2θ of 44.9° for FeC (Fe$_3$C and Fe$_7$C$_3$) and elemental iron. In addition, as compared with the composition S-4.5, the composition S-4.7 had diffraction peaks at 2θ of 42.6° and 44.2° for cobalt monooxide and elemental cobalt.

EXAMPLE 4.8

The example 4.1 was repeated except that on a metal oxide basis, iron nitrate was used in an amount of 50 g and cobalt nitrate was used in an amount of 150 g, to obtain the composition S-4.8.

The test results of the content of each component in the composition S-4.8 were listed in Table 4.1. The composition S-4.8 had similar XRD test results to the example 4.1. In the XRD spectrum of the composition S-4.8 which was subjected to the treatment under a carbon-containing atmosphere, not only there were a diffraction peak at about 43.0° for MgO and a diffraction peak at about 45.0° for Al$_2$O$_3$, Co$_2$AlO$_4$ and MgAl$_2$O$_4$, but also the diffraction peaks at about 43.0° and at about 45.0° became substantially stronger and shifted to the left, which might be attributable to the fact that the composition S-4.8 subjected to the treatment under a carbon-containing atmosphere had a diffraction peak at 2θ of 44.9° for FeC (Fe$_3$C and Fe$_7$C$_3$) and elemental iron. In addition, as compared with the composition S-4.5, the composition S-4.8 had diffraction peaks at 2θ of 42.6° and 44.2° for cobalt monooxide and elemental cobalt.

EXAMPLE 4.9

The example 4.1 was repeated except that on a metal oxide basis, iron nitrate was used in an amount of 150 g and cobalt nitrate was used in an amount of 50 g, to obtain the composition S-4.9.

The test results of the content of each component in the composition S-4.9 were listed in Table 4.1. The composition S-4.9 had similar XRD test results to the example 4.1. In the XRD spectrum of the composition S-4.9 which was subjected to the treatment under a carbon-containing atmosphere, not only there were a diffraction peak at about 43.0° for MgO and a diffraction peak at about 45.0° for Al$_2$O$_3$, Co$_2$AlO$_4$ and MgAl$_2$O$_4$, but also the diffraction peaks at about 43.0° and at about 45.0° became substantially stronger and shifted to the left, which might be attributable to the fact that the composition S-4.9 subjected to the treatment under a carbon-containing atmosphere had a diffraction peak at 2θ of 44.9° for FeC (Fe$_3$C and Fe$_7$C$_3$) and elemental iron. In addition, as compared with the composition S-4.5, the composition S-4.9 had diffraction peaks at 2θ of 42.6° and 44.2° for cobalt monooxide and elemental cobalt.

EXAMPLE 4.10

The example 4.1 was repeated except that the CO/N$_2$ mixture gas with a CO concentration of 10 volume % was replaced with an ethane/nitrogen mixture gas with an ethane concentration of 10 volume %, to obtain the composition 4.10.

The test results of the content of each component in the composition S-4.10 were listed in Table 4.1. The composition S-4.10 had similar XRD test results to the example 4.1. In the XRD spectrum of the composition S-4.10 which was subjected to the treatment under a carbon-containing atmosphere, not only there were a diffraction peak at about 43.0° for MgO and a diffraction peak at about 45.0° for Al$_2$O$_3$, Co$_2$AlO$_4$ and MgAl$_2$O$_4$, but also the diffraction peaks at about 43.0° and at about 45.0° became substantially stronger and shifted to the left, which might be attributable to the fact that the composition S-4.10 subjected to the treatment under a carbon-containing atmosphere had a diffraction peak at 2θ of 44.9° for FeC (Fe$_3$C and Fe$_7$C$_3$) and elemental iron. In addition, as compared with the composition S-4.5, the composition S-4.10 had diffraction peaks at 2θ of 42.6° and 44.2° for cobalt monooxide and elemental cobalt.

COMPARATIVE EXAMPLE 4.1

The example 4.1 was repeated except that on a metal oxide basis, cobalt nitrate was replaced with iron nitrate in the same amount, to obtain the composition D-4.1.

The test results of the content of each component in the composition D-4.1 were listed in Table 4.1.

COMPARATIVE EXAMPLE 4.2

The example 4.1 was repeated except that on a metal oxide basis, iron nitrate was replaced with cobalt nitrate in the same amount, to obtain the composition D-4.2.

The test results of the content of each component in the composition D-4.2 were listed in Table 4.1.

TABLE 4.1

| | Composition | The first metal element | | The second metal | The fourth metal |
|---|---|---|---|---|---|
| | No. | Fe | Co | element | element |
| Example 4.1 | S-4.1 | 5 | 5 | 5 | 0.06 |
| Comparative example 4.1 | D-4.1 | 10 | — | 5 | 0.06 |
| Comparative example 4.2 | D-4.2 | — | 10 | 5 | 0.06 |
| Example 4.2 | S-4.2 | 7 | 3 | 8 | 0.055 |
| Example 4.3 | S-4.3 | 5 | 10 | 10 | 0.05 |
| Example 4.4 | S-4.4 | 10 | 6 | 12 | 0.065 |
| Example 4.5 | S-4.5 | 5 | 5 | 5 | 0.06 |
| Example 4.6 | S-4.6 | 5 | 5 | 5 | 0.06 |
| Example 4.7 | S-4.7 | 5 | 5 | 5 | 0.06 |
| Example 4.8 | S-4.8 | 2.5 | 7.5 | 5 | 0.06 |
| Example 4.9 | S-4.9 | 7.5 | 2.5 | 5 | 0.06 |
| Example 4.10 | S-4.10 | 5 | 5 | 5 | 0.06 |

The contents of the first metal element and the second metal element were presented as percentage by weight on an oxide basis. The content of the fourth metal element was presented as percentage by weight on an element basis.

EXAMPLE 5.1

(1) 2.62 kg pseudo boehmite was added to 14.2 kg deionized water and dispersed to make a slurry. To the slurry, 238 mL hydrochloric acid was added to acidize for 15 min, to obtain an alumina gel. On a metal oxide basis, 60 g iron nitrate (calculated in $Fe_2O_3$, the same below), 60 g cobalt nitrate (calculated in $Co_2O_3$, the same below) and 100 g $KMnO_4$ (calculated in MnO, the same below) were added to 3500 mL water, stirred until fully dissolved, and then the alumina gel was added thereto, stirred for another 15 min to obtain a first solution. 100 g MgO were added to 300 g water, stirred for 10 min, and then added to the first solution, stirred for another 20 min to obtain a slurry. The slurry was spray dried. 150 g of the particles obtained by spray drying (with an average particle size being 65 μm and the particles having a particle size of 40-80 μm being in an amount of 60%, the same below) were weighted and transferred to a tubular furnace. A $CO/N_2$ mixture gas with a CO concentration of 10 volume % was introduced to the tubular furnace at a flow rate of 100 mL/min. The treatment was operated at 600° C. for 1.5 h, to obtain a semi-finished composition.

(2) 100 g of the semi-finished composition was weighted and added into 700 ml water, then 4.8 mL of a $RuCl_3$ solution with the mass content of 12.5 g/L on the metal element basis was added thereto, stirred for 20 min and filtered to obtain a solid product. The solid product was rinsed with 80 mL aqueous ammonia with a concentration of 2 mol/L, and dried at 100° C. for 4 h and then calcined at 400° C. for 2 h, to get the composition S-5.1.

The test results of the content of each component in the composition S-5.1 were listed in Table 5.1.

The composition S-5.1 was analyzed by XRD, and the XRD spectrum was shown in FIG. 5. As shown in FIG. 5, there were a diffraction peak at about 43.0° for MgO and a diffraction peak at about 45.0° for $Al_2O_3$, $Co_2AlO_4$ and $MgAl_2O_4$ in the XRD spectrum of the composition S-5.5 which was not subjected to the treatment under a carbon-containing atmosphere. In the XRD spectrum of the composition S-5.1 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.1 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.1 had diffraction peaks at 2θ of 42.6° and 44.2° were for cobalt monooxide and elemental cobalt.

EXAMPLE 5.2

(1) 2.53 kg pseudo boehmite was added to 13.7 kg deionized water and dispersed to make a slurry. To the slurry, 229 mL hydrochloric acid was added to acidize for 15 min, to give an alumina gel. On a metal oxide basis, 100 g iron nitrate, 60 g cobalt nitrate and 60 g $KMnO_4$ (calculated in MnO) were added to 3500 mL water, stirred until fully dissolved, and then the alumina gel was added thereto, stirred for another 15 min to obtain a first solution. 160 g MgO were added to 480 g water, stirred for 10 min, and then added to the first solution, stirred for another 20 min to obtain a slurry. The slurry was spray dried. 150 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 500° C. for 3 h, to obtain a semi-finished composition.

(2) 100 g of the semi-finished composition was weighted and added into 700 ml water, then 4.4 mL of a $RuCl_3$ solution with the mass content of 12.5 g/L on the metal element basis was added thereto, stirred for 20 min and filtered to obtain a solid product. The solid product was rinsed with 100 mL aqueous ammonia with a concentration of 2 mol/L, and dried at 100° C. for 4 h and then calcined at 400° C. for 2 h, to get the composition S-5.2.

The test results of the content of each component in the composition S-5.2 were listed in Table 5.1. The composition S-5.2 had similar XRD test results to the example 5.1. In the XRD spectrum of the composition S-5.2 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.2 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.2 had diffraction peaks at 2θ of 42.6° and 44.2° for cobalt monooxide and elemental cobalt.

EXAMPLE 5.3

(1) 2.09 kg pseudo boehmite was added to 11.3 kg deionized water and dispersed to make a slurry. To the slurry, 190 mL hydrochloric acid was added to acidize for 15 min, to obtain an alumina gel. On a metal oxide basis, 100 g iron nitrate, 200 g cobalt nitrate and 160 g $KMnO_4$ (calculated in MnO) were added to 4000 mL water, stirred until fully dissolved, and then the alumina gel was added thereto, stirred for another 15 min to obtain a first solution. 200 g MgO were added to 600 g water, stirred for 10 min, and then added to the first solution, stirred for another 20 min to obtain a slurry. The slurry was spray dried. 150 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 650° C. for 1 h, to obtain a semi-finished composition.

(2) 100 g of the semi-finished composition was weighted and added into 700 ml water, then 4 mL of a $RuCl_3$ solution with the mass content of 12.5 g/L on the metal element basis was added thereto, stirred for 20 min and filtered to obtain a solid product. The solid product was rinsed with 80 mL aqueous ammonia with a concentration of 2 mol/L, and dried at 100° C. for 4 h and then calcined at 400° C. for 2 h, to get the composition S-5.3.

The test results of the content of each component in the composition S-5.3 were listed in Table 5.1. The composition S-5.3 had similar XRD test results to the example 5.1. In the XRD spectrum of the composition S-5.3 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.3 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.3 had diffraction peaks at 2θ of 42.6° and 44.2° for cobalt monooxide and elemental cobalt.

EXAMPLE 5.4

(1) 2.09 kg pseudo boehmite was added to 11.3 kg deionized water and dispersed to make a slurry. To the slurry, 190 mL hydrochloric acid was added to acidize for 15 min, to obtain an alumina gel. On a metal oxide basis, 200 g iron nitrate, 120 g cobalt nitrate and 100 g $KMnO_4$ (calculated in MnO) were added to 3500 mL water, stirred until fully dissolved, and then the alumina gel was added thereto, stirred for another 15 min to obtain a first solution. 240 g MgO were added to 720 g water, stirred for 10 min, and then added to the first solution, stirred for another 20 min to obtain a slurry. The slurry was spray dried. 150 g of the particles obtained by spray drying were weighted and transferred to a tubular furnace. A $CO/N_2$ mixture gas with a CO concentration of 10 volume % was introduced to the tubular furnace at a flow rate of 100 mL/min. The treatment was operated at 600° C. for 1.5 h, to obtain a semi-finished composition.

(2) 100 g of the semi-finished composition was weighted and added into 700 ml water, then 5.2 mL of a $RuCl_3$ solution with the mass content of 12.5 g/L on the metal element basis was added thereto, stirred for 20 min and filtered to obtain a solid product. The solid product was rinsed with 80 mL aqueous ammonia with a concentration of 2 mol/L, and dried at 100° C. for 4 h and then calcined at 400° C. for 2 h, to get the composition S-5.4.

The test results of the content of each component in the composition S-5.4 were listed in Table 5.1. The composition S-5.4 had similar XRD test results to the example 5.1. In the XRD spectrum of the composition S-5.4 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.4 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.4 had diffraction peaks at 2θ of 42.6° and 44.2° for cobalt monooxide and elemental cobalt.

EXAMPLE 5.5

The example 5.1 was repeated except that the $CO/N_2$ mixture gas with a CO concentration of 10 volume % was replaced with air, to obtain the composition 5.5.

The test results of the content of each component in the composition S-5.5 were listed in Table 5.1. The composition S-5.5 was analyzed by XRD. It could be seen from the XRD spectrum (as shown in FIG. 5) that there was not obvious diffraction peaks at 2θ of 42.6°, 44.2° and 44.9°, which shown that all of Fe and Co in the composition S-5.5 were presented in form of oxides.

EXAMPLE 5.6

The example 5.1 was repeated except that the step (2) did not involve the rinsing of the solid product with 80 mL aqueous ammonia with a concentration of 2 mol/L. Instead, the solid product was directly dried and then calcined, to get the composition S-5.6.

The test results of the content of each component in the composition S-5.6 were listed in Table 5.1. The composition S-5.6 had similar XRD test results to the example 5.1. In the XRD spectrum of the composition S-5.6 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.6 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.6 had diffraction peaks at 2θ of 42.6° and 44.2° for cobalt monooxide and elemental cobalt.

EXAMPLE 5.7

The example 5.1 was repeated except that on a metal oxide basis, MgO was replaced with CaO in the same amount, to obtain the composition S-5.7.

The test results of the content of each component in the composition S-5.7 were listed in Table 5.1. The composition S-5.7 had similar XRD test results to the example 5.1. In the XRD spectrum of the composition S-5.7 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.7 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.7 had diffraction peaks at 2θ of 42.6° and 44.2° for cobalt monooxide and elemental cobalt.

EXAMPLE 5.8

The example 5.1 was repeated except that on a metal oxide basis, $KMnO_4$ was replaced with $CeCl_2$ in the same amount, to obtain the composition S-5.6.

The test results of the content of each component in the composition S-5.8 were listed in Table 5.1. The composition S-5.8 had similar XRD test results to the example 5.1. In the XRD spectrum of the composition S-5.8 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.8 subjected to the treatment under a carbon-containing atmosphere had a diffraction peak 2θ of 44.9° for FeC ($Fe_3C$ and $Fe_7C_3$) and elemental iron. In addition, as compared with the composition S-5.5, the composition S-5.8 had diffraction peaks at 2θ of 42.6° and 44.2° for cobalt monooxide and elemental cobalt.

EXAMPLE 5.9

The example 5.1 was repeated except that on a metal oxide basis, iron nitrate was used in an amount of 30 g and cobalt nitrate was used in an amount of 90 g, to obtain the composition S-5.9.

The test results of the content of each component in the composition S-5.9 were listed in Table 5.1. The composition S-5.9 had similar XRD test results to the example 5.1. In the XRD spectrum of the composition S-5.9 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.9 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.9 had diffraction peaks at 2θ of 42.6° and 44.2° for cobalt monooxide and elemental cobalt.

EXAMPLE 5.10

The example 5.1 was repeated except that on a metal oxide basis, iron nitrate was used in an amount of 90 g and cobalt nitrate was used in an amount of 30 g, to obtain the composition S-5.10.

The test results of the content of each component in the composition S-5.10 were listed in Table 5.1. The composition S-5.10 had similar XRD test results to the example 5.1. In the XRD spectrum of the composition S-5.10 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.10 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.10 had diffraction peaks at 2θ of 42.6° and 44.2° for cobalt monooxide and elemental cobalt.

EXAMPLE 5.11

The example 5.1 was repeated except that the $CO/N_2$ mixture gas with a CO concentration of 10 volume % was replaced with an ethane/nitrogen mixture gas with an ethane concentration of 10 volume %, to obtain the composition 5.11.

The test results of the content of each component in the composition S-5.11 were listed in Table 5.1. The composition S-5.11 had similar XRD test results to the example 5.1. In the XRD spectrum of the composition S-5.11 which was subjected to the treatment under a carbon-containing atmosphere, not only there were a diffraction peak at about 43.0° for MgO and a diffraction peak at about 45.0° for $Al_2O_3$, $Co_2AlO_4$ and $MgAl_2O_4$, but also the diffraction peaks at about 43.0° and at about 45.0° became substantially stronger and shifted to the left, which might be attributable to the fact that the composition S-5.11 subjected to the treatment under a carbon-containing atmosphere had a diffraction peak at 2θ of 44.9° for FeC ($Fe_3C$ and $Fe_7C_3$) and elemental iron. In addition, as compared with the composition S-5.5, the composition S-5.11 had diffraction peaks at 2θ of 42.6° and 44.2° for cobalt monooxide and elemental cobalt.

COMPARATIVE EXAMPLE 5.1

The example 5.1 was repeated except that on a metal oxide basis, cobalt nitrate was replaced with iron nitrate in the same amount, to obtain the composition D-5.1.

The test results of the content of each component in the composition D-5.1 were listed in Table 5.1.

COMPARATIVE EXAMPLE 5.2

The example 5.1 was repeated except that on a metal oxide basis, iron nitrate was replaced with cobalt nitrate in the same amount, to obtain the composition D-5.2.

The test results of the content of each component in the composition D-5.2 were listed in Table 5.1.

TABLE 5.1

| | Composition No. | The first metal element Fe | The first metal element Co | The second metal element | The third metal element | The fourth metal element |
|---|---|---|---|---|---|---|
| Example 5.1 | S-5.1 | 3 | 3 | 5 | 5 | 0.06 |
| Comparative example 5.1 | D-5.1 | 6 | — | 5 | 5 | 0.06 |
| Comparative example 5.2 | D-5.2 | — | 6 | 5 | 5 | 0.06 |
| Example 5.2 | S-5.2 | 5 | 3 | 8 | 3 | 0.055 |
| Example 5.3 | S-5.3 | 5 | 10 | 10 | 8 | 0.05 |
| Example 5.4 | S-5.4 | 10 | 6 | 12 | 5 | 0.065 |
| Example 5.5 | S-5.5 | 3 | 3 | 5 | 5 | 0.06 |
| Example 5.6 | S-5.6 | 3 | 3 | 5 | 5 | 0.06 |
| Example 5.7 | S-5.7 | 3 | 3 | 5 | 5 | 0.06 |
| Example 5.8 | S-5.8 | 3 | 3 | 5 | 5 | 0.06 |
| Example 5.9 | S-5.9 | 1.5 | 4.5 | 5 | 5 | 0.06 |
| Example 5.10 | S-5.10 | 4.5 | 1.5 | 5 | 5 | 0.06 |
| Example 5.11 | S-5.11 | 3 | 3 | 5 | 5 | 0.06 |

The contents of the first metal element, the second metal element and the third metal element were presented as percentage by weight on an oxide basis. The content of the fourth metal element was presented as percentage by weight on an element basis.

TESTING EXAMPLE 1

This testing example was used to show the effects of the compositions capable of reducing CO and NOx emissions provided in the examples and comparative examples on reducing CO and NOx emissions in the incomplete regeneration flue gas under aerobic conditions.

The compositions capable of reducing CO and NOx emissions were mixed with the above-mentioned catalytic cracking catalyst (Cat-A), wherein the compositions capable of reducing CO and NOx emissions were in an amount of 2.2% by weight of the total weight of the compositions capable of reducing CO and NOx emissions and the catalytic cracking catalyst, and aged at 800° C. under 100% steam atmosphere for 12 h. Then, they were subjected to a catalytic cracking reaction-regeneration evaluation.

The catalytic cracking reaction-regeneration evaluation was operated on a small fixed bed device simulating the reducing of NOx in the flue gas, with a loading of the aged catalyst of 10 g, a reaction temperature of 650° C., and a flow rate by volume of the feed gas of 1500 mL/min. The feed gas contained 3.7% by volume of CO, 0.5% by volume of oxygen, 800 ppm $NH_3$, and balance of $N_2$. The gas products were analyzed with on-line infrared analyzer to obtain the concentrations of $NH_3$, NOx and CO after reaction. The results were listed in Table 1.2-5.2.

TABLE 1.2

| | No. | Concentration of NOx, ppm | Concentration of $NH_3$, ppm | Concentration of CO, % by volume |
|---|---|---|---|---|
| Example 1.1 | S-1.1 | 77 | 109 | 2.8 |
| Comparative example 1.1 | D-1.1 | 165 | 221 | 2.75 |
| Comparative example 1.2 | D-1.2 | 153 | 220 | 2.83 |
| Comparative example 3 | D-3 | 109 | 321 | 3.15 |
| Example 1.2 | S-1.2 | 86 | 117 | 2.77 |
| Example 1.3 | S-1.3 | 57 | 76 | 2.71 |
| Example 1.4 | S-1.4 | 55 | 73 | 2.71 |
| Example 1.5 | S-1.5 | 79 | 114 | 2.79 |
| Example 1.6 | S-1.6 | 75 | 110 | 2.81 |
| Example 1.7 | S-1.7 | 78 | 114 | 2.77 |
| Example 1.8 | S-1.8 | 75 | 110 | 2.79 |

TABLE 2.2

| | No. | Concentration of NOx, ppm | Concentration of $NH_3$, ppm | Concentration of CO, % by volume |
|---|---|---|---|---|
| Example 2.1 | S-2.1 | 71 | 103 | 2.81 |
| Comparative example 2.1 | D-2.1 | 154 | 218 | 2.76 |
| Comparative example 2.2 | D-2.2 | 141 | 216 | 2.85 |
| Comparative example 3 | D-3 | 109 | 321 | 3.15 |
| Example 2.2 | S-2.2 | 73 | 105 | 2.8 |
| Example 2.3 | S-2.3 | 49 | 67 | 2.72 |
| Example 2.4 | S-2.4 | 48 | 64 | 2.71 |
| Example 2.5 | S-2.5 | 75 | 107 | 2.79 |
| Example 2.6 | S-2.6 | 79 | 112 | 2.8 |
| Example 2.7 | S-2.7 | 72 | 109 | 2.83 |
| Example 2.8 | S-2.8 | 77 | 111 | 2.78 |
| Example 2.9 | S-2.9 | 70 | 105 | 2.8 |

TABLE 3.2

| | No. | Concentration of NOx, ppm | Concentration of $NH_3$, ppm | Concentration of CO, % by volume |
|---|---|---|---|---|
| Example 3.1 | S-3.1 | 78 | 95 | 2.92 |
| Comparative example 3.1 | D-3.1 | 139 | 211 | 2.9 |
| Comparative example 3.2 | D-3.2 | 137 | 207 | 2.94 |
| Comparative example 3 | D-3 | 109 | 321 | 3.15 |
| Example 3.2 | S-3.2 | 72 | 91 | 2.84 |
| Example 3.3 | S-3.3 | 45 | 9 | 2.71 |
| Example 3.4 | S-3.4 | 42 | 23 | 2.71 |
| Example 3.5 | S-3.5 | 82 | 99 | 2.9 |
| Example 3.6 | S-3.6 | 93 | 112 | 2.91 |

TABLE 3.2-continued

| | No. | Concentration of NOx, ppm | Concentration of $NH_3$, ppm | Concentration of CO, % by volume |
|---|---|---|---|---|
| Example 3.7 | S-3.7 | 89 | 107 | 2.93 |
| Example 3.8 | S-3.8 | 80 | 101 | 2.93 |
| Example 3.9 | S-3.9 | 83 | 104 | 2.91 |
| Example 3.10 | S-3.10 | 76 | 97 | 2.91 |

TABLE 4.2

| | No. | Concentration of NOx, ppm | Concentration of $NH_3$, ppm | Concentration of CO, % by volume |
|---|---|---|---|---|
| Example 4.1 | S-4.1 | 52 | 72 | 2.79 |
| Comparative example 4.1 | D-4.1 | 120 | 160 | 2.74 |
| Comparative example 4.2 | D-4.2 | 107 | 156 | 2.82 |
| Comparative example 3 | D-3 | 109 | 321 | 3.15 |
| Example 4.2 | S-4.2 | 57 | 74 | 2.77 |
| Example 4.3 | S-4.3 | 32 | 42 | 2.71 |
| Example 4.4 | S-4.4 | 21 | 33 | 2.7 |
| Example 4.5 | S-4.5 | 54 | 75 | 2.77 |
| Example 4.6 | S-4.6 | 68 | 76 | 2.80 |
| Example 4.7 | S-4.7 | 56 | 78 | 2.78 |
| Example 4.8 | S-4.8 | 51 | 73 | 2.8 |
| Example 4.9 | S-4.9 | 55 | 75 | 2.76 |
| Example 4.10 | S-4.10 | 51 | 73 | 2.78 |

TABLE 5.2

| | No. | Concentration of NOx, ppm | Concentration of $NH_3$, ppm | Concentration of CO, % by volume |
|---|---|---|---|---|
| Example 5.1 | S-5.1 | 58 | 59 | 2.89 |
| Comparative example 5.1 | D-5.1 | 115 | 151 | 2.87 |
| Comparative example 5.2 | D-5.2 | 107 | 147 | 2.92 |
| Comparative example 3 | D-3 | 109 | 321 | 3.15 |
| Example 5.2 | S-5.2 | 52 | 58 | 2.81 |
| Example 5.3 | S-5.3 | 35 | 1 | 2.7 |
| Example 5.4 | S-5.4 | 27 | 3 | 2.7 |
| Example 5.5 | S-5.5 | 62 | 63 | 2.87 |
| Example 5.6 | S-5.6 | 75 | 62 | 2.91 |
| Example 5.7 | S-5.7 | 69 | 76 | 2.88 |
| Example 5.8 | S-5.8 | 65 | 72 | 2.9 |
| Example 5.9 | S-5.9 | 58 | 62 | 2.91 |
| Example 5.10 | S-5.10 | 61 | 63 | 2.88 |
| Example 5.11 | S-5.11 | 57 | 60 | 2.88 |

It could be seen from the data in the above tables that, when used in the incomplete regeneration process of a catalytic cracking (under aerobic condition), the inventive compositions capable of reducing CO and NOx emissions had better performance of reducing CO, $NH_3$ and NOx emissions, as compared with the compositions capable of reducing CO and NOx emissions provided in the comparative example. In addition, during the evaluation, the aged composition capable of reducing CO and NOx emissions was used. The aged composition capable of reducing CO and NOx emissions still achieved high activity of removing CO, $NH_3$ and NOx. Therefore, the inventive composition capable of reducing CO and NOx emissions had good hydrothermal stability.

TESTING EXAMPLE 2

This testing example was used to show the effects of the compositions capable of reducing CO and NOx emissions provided in the examples and comparative examples on reducing CO and NOx emissions in the incomplete regeneration flue gas under anaerobic conditions.

The test example 1 was repeated except that the feed gas contained 3.7% by volume of CO, 800 ppm $NH_3$, and balance of $N_2$. The concentrations of $NH_3$, NOx and CO after reaction were obtained and the results were listed in Table 1.3-3.3.

TABLE 1.3

| | No. | Concentration of NOx, ppm | Concentration of $NH_3$, ppm | Concentration of CO, % by volume |
|---|---|---|---|---|
| Example 1.1 | S-1.1 | 0 | 191 | 3.7 |
| Comparative example 1.1 | D-1.1 | 0 | 389 | 3.69 |
| Comparative example 1.2 | D-1.2 | 0 | 387 | 3.68 |
| Comparative example 3 | D-3 | 0 | 423 | 3.7 |
| Example 1.2 | S-1.2 | 0 | 204 | 3.69 |
| Example 1.3 | S-1.3 | 0 | 133 | 3.68 |
| Example 1.4 | S-1.4 | 0 | 129 | 3.68 |
| Example 1.5 | S-1.5 | 0 | 199 | 3.69 |
| Example 1.6 | S-1.6 | 0 | 194 | 3.68 |
| Example 1.7 | S-1.7 | 0 | 197 | 3.69 |
| Example 1.8 | S-1.8 | 0 | 192 | 3.68 |

TABLE 2.3

| | No. | Concentration of NOx, ppm | Concentration of $NH_3$, ppm | Concentration of CO, % by volume |
|---|---|---|---|---|
| Example 2.1 | S-2.1 | 0 | 182 | 3.69 |
| Comparative example 2.1 | D-2.1 | 0 | 386 | 3.69 |
| Comparative example 2.2 | D-2.2 | 0 | 381 | 3.7 |
| Comparative example 3 | D-3 | 0 | 423 | 3.7 |
| Example 2.2 | S-2.2 | 0 | 186 | 3.7 |
| Example 2.3 | S-2.3 | 0 | 117 | 3.67 |
| Example 2.4 | S-2.4 | 0 | 113 | 3.69 |
| Example 2.5 | S-2.5 | 0 | 188 | 3.67 |
| Example 2.6 | S-2.6 | 0 | 197 | 3.67 |
| Example 2.7 | S-2.7 | 0 | 185 | 3.67 |
| Example 2.8 | S-2.8 | 0 | 189 | 3.67 |
| Example 2.9 | S-2.9 | 0 | 183 | 3.68 |

TABLE 3.3

| | No. | Concentration of NOx, ppm | Concentration of $NH_3$, ppm | Concentration of CO, % by volume |
|---|---|---|---|---|
| Example 3.1 | S-3.1 | 0 | 184 | 3.7 |
| Comparative example 3.1 | D-3.1 | 0 | 399 | 3.69 |
| Comparative example 3.2 | D-3.2 | 0 | 387 | 3.69 |
| Comparative example 3 | D-3 | 0 | 423 | 3.7 |
| Example 3.2 | S-3.2 | 0 | 176 | 3.67 |
| Example 3.3 | S-3.3 | 0 | 51 | 3.65 |
| Example 3.4 | S-3.4 | 0 | 68 | 3.66 |
| Example 3.5 | S-3.5 | 0 | 195 | 3.67 |
| Example 3.6 | S-3.6 | 0 | 221 | 3.67 |
| Example 3.7 | S-3.7 | 0 | 213 | 3.67 |
| Example 3.8 | S-3.8 | 0 | 189 | 3.67 |
| Example 3.9 | S-3.9 | 0 | 191 | 3.67 |
| Example 3.10 | S-3.10 | 0 | 185 | 3.69 |

It could be seen from the above tables that, even used in treating the incomplete regeneration flue gas of a catalytic cracking under anaerobic condition, the inventive compositions capable of reducing CO and NOx emissions had better performance of reducing CO and $NH_3$ emissions, as compared with the compositions capable of reducing CO and NOx emissions provided in the comparative example. In addition, during the evaluation, the aged composition capable of reducing CO and NOx emissions was used. The aged composition capable of reducing CO and NOx emissions still achieved high activity of removing CO and $NH_3$. Therefore, the inventive composition capable of reducing CO and NOx emissions had good hydrothermal stability.

It could be seen from the data in the above tables that the inventive compositions capable of reducing CO and NOx emissions are suitable for the incomplete regeneration under both aerobic condition and anaerobic condition, and had better hydrothermal stability. In particular, when the preferred calcining under a carbon-containing atmosphere in accordance with was adopted, it was possible to further improve the performance of the compositions capable of reducing CO and NOx emissions; when the preferred metal elements in accordance with were adopted, it was possible to further improve the performance of the compositions capable of reducing CO and NOx emissions; and when the preferred weight ratio of Fe to Co in accordance with was adopted, it was possible to further improve the performance of the compositions capable of reducing CO and NOx emissions.

TESTING EXAMPLE 3

This testing example was used to show the effects of the compositions capable of reducing CO and NOx emissions provided in the examples and comparative examples on reducing CO and NOx emissions in the complete regeneration flue gas and their effects on the distribution of the resulting FCC products.

The compositions capable of reducing CO and NOx emissions were mixed with the catalytic cracking catalyst (Cat-A), wherein the compositions capable of reducing CO and NOx emissions were in an amount of 0.8% by weight of the total weight of the compositions capable of reducing CO and NOx emissions and the catalytic cracking catalyst, and aged at 800° C. under 100% steam atmosphere for 12 h. Then, they were subjected to a catalytic cracking reaction-regeneration evaluation.

The catalytic cracking reaction-regeneration evaluation was operated on a small fixed bed device, with a loading of the aged catalyst of 10 g, a reaction temperature of 500° C., and a ratio of catalysts to oil of 6. The characters of the feeding oil were given in Table 4. The gas products were analyzed by on-line chromatography to obtain the composition of the cracked gases. The liquid products were analyzed by off-line chromatography to obtain the yields of gasoline, diesel and heavy oil.

After the reaction, after stripping for 10 min with $N_2$, regeneration was operated by in-situ coke burning with a flow rate of the regeneration air of 200 mL/min, a regeneration time of 15 min, and the initial temperature of the regeneration being the same as the reaction temperature. The flue gas in the regeneration process was collected. After the regeneration, the yield of coke was calculated according to the integration data of $CO_2$ infrared analyzer. The distribution of the FCC products was obtained by normalizing the yields of all products, as shown in Table 4.5-5.5, where the conversion referred to the sum of the yields of dry gas, liquefied gas, gasoline and coke. The concentrations of NOx and CO in the flue gas were measured by Testo350pro flue gas analyzer, and the results were shown in table 4.6-5.6.

TABLE 4

| items | Value |
| --- | --- |
| density (20° C.), g/cm³ | 0.9044 |
| viscosity(100° C.), mm²/s | 9.96 |
| four components, wt % | |
| saturated hydrocarbons | 56.8 |
| aromatic hydrocarbon | 24.2 |
| resins | 18.2 |
| asphalts | 0.8 |
| freezing point, ° C. | 40 |
| aniline point, ° C. | 95.8 |
| Elemental composition, wt % | |
| C | 85.98 |
| H | 12.86 |
| S | 0.55 |
| N | 0.18 |
| residual carbon, wt % | 3.0 |
| distillation range, ° C. | |
| initial boiling point | 243 |
| 5% | 294 |
| 10% | 316 |
| 30% | 395 |
| 50% | 429 |
| 70% | 473 |
| 90% | — |

TABLE 4.5

| Distribution of the products | Example 4.1 | Example 4.2 | Example 4.3 | Example 4.4 | Comparative example 3 |
| --- | --- | --- | --- | --- | --- |
| dry gas, wt % | 1.67 | 1.68 | 1.71 | 1.70 | 1.73 |
| liquefied gas, wt % | 19.26 | 19.38 | 19.57 | 19.49 | 19.20 |
| coke, wt % | 7.16 | 7.13 | 7.21 | 7.22 | 7.29 |
| gasoline, wt % | 49.70 | 49.64 | 49.49 | 49.25 | 49.44 |
| Diesel, wt % | 15.17 | 15.12 | 14.88 | 15.27 | 15.27 |
| heavy oil, wt % | 7.03 | 7.06 | 7.14 | 7.07 | 7.06 |
| conversion, % | 77.79 | 77.83 | 77.98 | 77.66 | 77.66 |

TABLE 5.5

| distribution of the products | Example 5.1 | Example 5.2 | Example 5.3 | Example 5.4 | Comparative example 3 |
| --- | --- | --- | --- | --- | --- |
| dry gas, wt % | 1.72 | 1.70 | 1.72 | 1.71 | 1.73 |
| liquefied gas, wt % | 19.27 | 19.39 | 19.57 | 19.50 | 19.20 |
| coke, wt % | 7.16 | 7.15 | 7.22 | 7.22 | 7.29 |
| gasoline, wt % | 49.66 | 49.62 | 49.48 | 49.26 | 49.44 |
| Diesel, wt % | 15.16 | 15.10 | 14.87 | 15.26 | 15.27 |
| heavy oil, wt % | 7.03 | 7.04 | 7.13 | 7.06 | 7.06 |
| conversion, % | 77.81 | 77.86 | 77.99 | 77.69 | 77.66 |

It could be seen from the above tables that the use of the inventive compositions capable of reducing CO and NOx emissions in combination with a catalytic cracking catalyst led to low yields of coke and dry gas in FCC products.

TABLE 4.6

| | No. | Concentration of NOx, ppm | Concentration of CO, % by volume |
| --- | --- | --- | --- |
| Example 4.1 | S-4.1 | 85 | 0.36 |
| Comparative examples 4.1 | D-4.1 | 194 | 0.35 |
| Comparative examples 4.2 | D-4.2 | 180 | 0.37 |
| Comparative examples 3 | D-3 | 264 | 0.48 |
| Example 4.2 | S-4.2 | 91 | 0.36 |
| Example 4.3 | S-4.3 | 51 | 0.34 |
| Example 4.4 | S-4.4 | 36 | 0.33 |
| Example 4.5 | S-4.5 | 89 | 0.36 |
| Example 4.6 | S-4.6 | 103 | 0.37 |
| Example 4.7 | S-4.7 | 92 | 0.36 |
| Example 4.8 | S-4.8 | 85 | 0.37 |
| Example 4.9 | S-4.9 | 90 | 0.35 |
| Example 4.10 | S-4.10 | 85 | 0.36 |

TABLE 5.6

| | No. | Concentration of NOx, ppm | Concentration of CO, % by volume |
| --- | --- | --- | --- |
| Example 5.1 | S-5.1 | 85 | 0.40 |
| Comparative examples 5.1 | D-5.1 | 185 | 0.39 |
| Comparative examples 5.2 | D-5.2 | 175 | 0.41 |
| Comparative examples 3 | D-3 | 264 | 0.48 |
| Example 5.2 | S-5.2 | 78 | 0.37 |
| Example 5.3 | S-5.3 | 34 | 0.33 |
| Example 5.4 | S-5.4 | 27 | 0.33 |
| Example 5.5 | S-5.5 | 90 | 0.39 |
| Example 5.6 | S-5.6 | 102 | 0.40 |
| Example 5.7 | S-5.7 | 104 | 0.39 |
| Example 5.8 | S-5.8 | 98 | 0.40 |
| Example 5.9 | S-5.9 | 86 | 0.40 |
| Example 5.10 | S-5.10 | 89 | 0.39 |
| Example 5.11 | S-5.11 | 84 | 0.39 |

It could be seen from the data in the above tables that, when used in a catalytic cracking process, the inventive compositions capable of reducing CO and NOx emissions had better performance of reducing CO and NOx emissions, as compared with the compositions capable of reducing CO and NOx emissions provided in the comparative example. In addition, during the evaluation, the aged composition capable of reducing CO and NOx emissions was used. The aged composition capable of reducing CO and NOx emissions still achieved high activity of removing CO and $NH_3$.

Therefore, the inventive composition capable of reducing CO and NOx emissions had good hydrothermal stability.

The preferred embodiments of the invention have been described in detail. However, the present invention is not limited to the specific details of the above embodiments. Various simple modifications may be made to the embodiments of the present invention within the scope of the technical concept of the present invention. Such simple modifications are within the protection scope of the present invention.

It should be noted that the various features described in the above embodiments may be combined in any suitable manner without departing from the scope of the invention. The invention is not described in detail for the possible combinations in order to avoid unnecessary repetition.

In addition, any combination of the embodiments of the present invention is also possible as long as it does not depart from the spirit of the present invention, which should be considered as the disclosure of the present invention.

The invention claimed is:

1. A composition capable of reducing CO and NOx emissions, comprising:
    an inorganic oxide carrier;
    a first metal element supported on the inorganic oxide carrier; and
    a second metal element supported on the inorganic oxide carrier,
    wherein the first metal element is a mixture of metals selected from the group consisting of non-noble metal elements in Group VIII, wherein the first metal element includes Fe and Co at a weight ratio of Fe to Co of 1: (0.1-10) on an oxide basis,
    wherein the second metal element is at least one selected from the group consisting of metals of Group IA and/or Group IIA, and
    wherein, based on a total weight of the composition, the inorganic oxide carrier is in an amount of 10-90% by weight, and on an oxide basis, the first metal element is in an amount of 0.5-50% by weight and the second metal element is in an amount of 0.5-20% by weight,
    wherein at least part of Fe in the composition is in a form of iron carbide and elemental iron, and
    wherein at least part of Co in the composition is in a form of cobalt mono-oxide and elemental cobalt.

2. The composition according to claim 1, wherein the composition further comprises a third metal element supported on the inorganic oxide carrier, wherein the third metal is at least one selected from the group consisting of the non-noble metal elements of Groups IB to VIIB, and wherein, based on the total weight of the composition, the third metal element is in an amount of 0.5-20% by weight on an oxide basis.

3. The composition according to claim 2, wherein the composition further comprises a fourth metal element supported on the inorganic oxide carrier, wherein the fourth metal element is at least one selected from the group consisting of noble metal elements, and wherein, based on the total weight of the composition, the fourth metal element is in an amount of 0.001-0.15% by weight on an element basis.

4. The composition according to claim 1, wherein the composition comprises the inorganic oxide carrier, and the first metal element, the second metal element, a third metal element, and a fourth metal element supported on the inorganic oxide carrier, and wherein, based on the total weight of the composition, the inorganic oxide carrier is in an amount of 50-90% by weight, and on an oxide basis, the first metal element is in an amount of 3-30% by weight, the second metal element is in an amount of 1-20% by weight, the third metal element is in an amount of 1-10% by weight, and on an element basis, the fourth metal element is in an amount of 0.005-0.1% by weight.

5. The composition according to claim 1, wherein the weight ratio of Fe to Co is 1: (0.3-3) on an oxide basis.

6. The composition according to claim 1, wherein the inorganic oxide carrier is at least one selected from the group consisting of alumina, silica-alumina, zeolite, spinel, kaolin, diatomite, perlite, and perovskite.

7. The composition according to claim 3, wherein the second metal element is at least one selected from the group consisting of Na, K, Mg, and Ca;
    the third metal element is at least one selected from the group consisting of Cu, Zn, Ti, Zr, V, Cr, Mo, W, Mn, and rare earth elements; and
    the fourth metal element is at least one selected from the group consisting of Pt, Jr, Pd, Ru, and Rh.

8. A method of treating a flue gas, comprising contacting the composition of claim 1 with the flue gas, whereby reducing CO and NOx in the flue gas.

9. The method of claim 8, wherein the flue gas comprises emission from regenerating a spent catalyst in a catalytic cracking process.

10. A fluidized catalytic cracking method, comprising: contacting and reacting a hydrocarbon oil with a catalyst, and regenerating a spent catalyst, wherein the catalyst comprises a catalytic cracking catalyst and a composition of claim 1.

11. The fluidized catalytic cracking method according to claim 10, wherein the composition is in an amount of 0.05-5% by weight, based on the total weight of the catalyst.

* * * * *